United States Patent [19]

Hashimoto

[11] Patent Number: 5,692,072
[45] Date of Patent: Nov. 25, 1997

[54] EDGE DETECTING DEVICE

[75] Inventor: Takeshi Hashimoto, Fussa, Japan

[73] Assignee: Olympus Optical Co., Ltd., Tokyo, Japan

[21] Appl. No.: 249,641

[22] Filed: May 26, 1994

Related U.S. Application Data

[63] Continuation-in-part of Ser. No. 788,698, Nov. 6, 1991, abandoned.

[30] Foreign Application Priority Data

| Nov. 6, 1990 | [JP] | Japan | 2-300687 |
| May 15, 1991 | [JP] | Japan | 3-110305 |

[51] Int. Cl.$^6$ ................................................ G06K 9/48
[52] U.S. Cl. .................. 382/199; 382/210; 382/266
[58] Field of Search .................. 382/199, 200, 382/210, 266, 280

[56] References Cited

U.S. PATENT DOCUMENTS

| 4,764,974 | 8/1988 | Woods | 382/43 |
| 4,806,774 | 2/1989 | Lin et al. | 382/31 |
| 4,977,504 | 12/1990 | Funahashi | 382/132 |
| 4,998,286 | 3/1991 | Tsujiuchi et al. | 382/42 |
| 5,018,218 | 5/1991 | Peregrim et al. | 382/199 |
| 5,022,087 | 6/1991 | Peppers et al. | 382/31 |
| 5,029,227 | 7/1991 | Kawamura | 382/22 |
| 5,081,689 | 1/1992 | Meyer et al. | 382/189 |
| 5,121,445 | 6/1992 | Tsujiuchi et al. | 382/43 |
| 5,151,822 | 9/1992 | Hekker et al. | 382/43 |
| 5,194,918 | 3/1993 | Kino et al. | 382/280 |

FOREIGN PATENT DOCUMENTS

| 64-79880 | 3/1989 | Japan | G06F 15/70 |
| 2-96884 | 4/1990 | Japan | G06F 15/70 |
| 4-174306 | 6/1992 | Japan . | |
| 4-337878 | 11/1992 | Japan . | |

OTHER PUBLICATIONS

Optica Acta, 1968, vol. 15, No. 2, 113–127, K. G. Birch (see appln. page 2).

Data Processing of Image, pp. 268, 269 and Title Page, 1978.

Enomoto Data Processing of Image, Image Electronics Lecture Series 9, Institute of Television, 1978, pp. 268–269.

*Primary Examiner*—Leo Boudreau
*Assistant Examiner*—Phuoc Tran
*Attorney, Agent, or Firm*—Cushman, Darby & Cushman IP Group of Pillsbury Madison & Sutro LLP

[57] ABSTRACT

An edge detecting device with an image pickup unit for preparing an electric image signal from an optical signal from an object having edge information, a sampling device for converting the image signal into digital image data, a Fourier transformation device for converting the image data to data in the spatial frequency region, a filter for cutting off at least the zero order spatial frequency components, an inverse Fourier transformation device for converting the filtered spatial frequency data to real space data, a rough edge detecting device for obtaining rough edge data in a simplified form, an edge detector for detecting ultimate edge information on the basis of the data obtained by the inverse Fourier transformation device and the data obtained by the rough edge detecting device, and a display unit for displaying the ultimate edge information in a predetermined form. The edge detecting device is capable of detecting an edge, or a plurality of edges, including a light-dark boundary contained in the optical signal from the object with high accuracy.

7 Claims, 19 Drawing Sheets

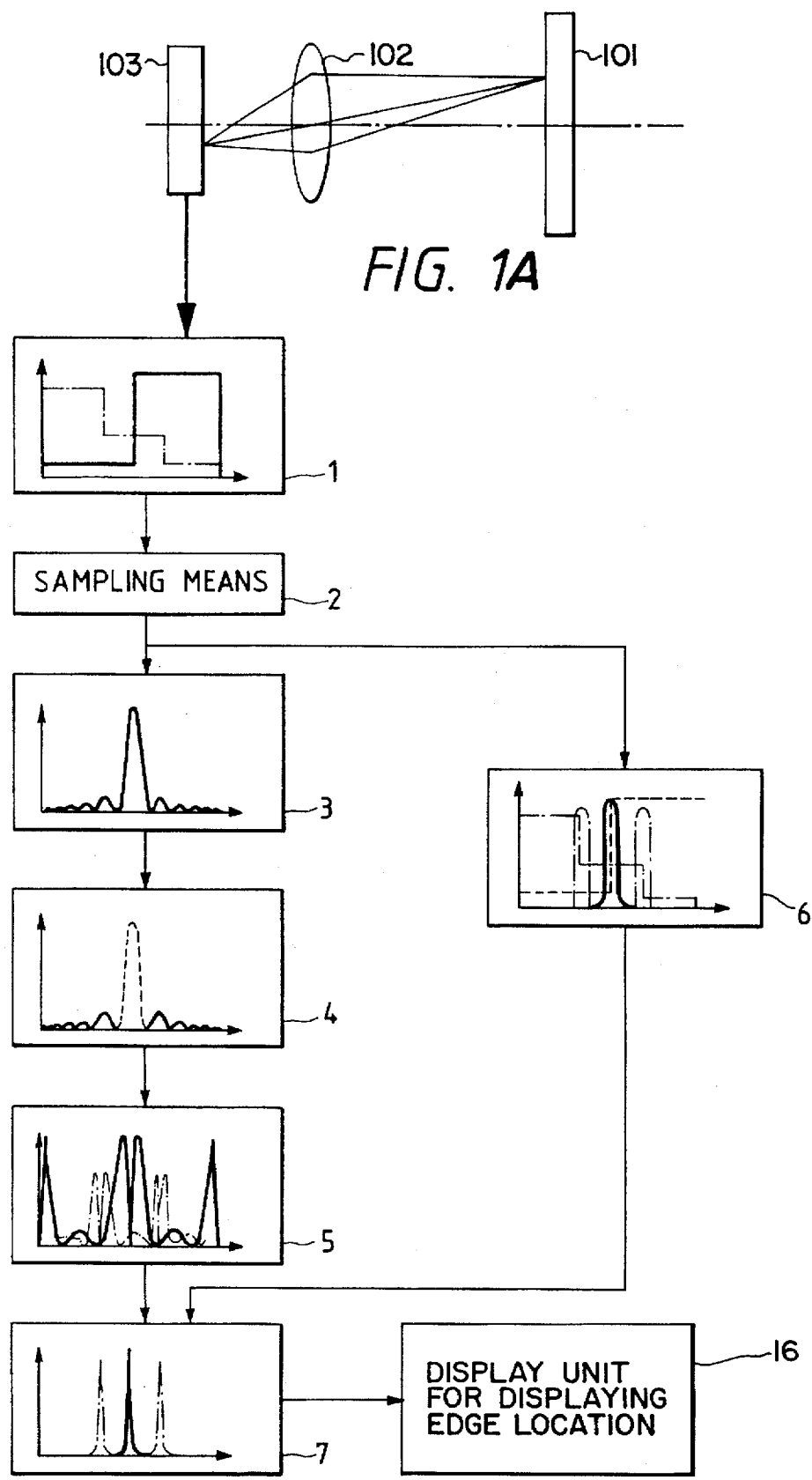

EDGE DETECTING DEVICE

CROSS REFERENCE TO RELATED APPLICATIONS

This is a continuation-in-part of application Ser. No. 07/788,698, filed on Nov. 6, 1991, now abandoned.

BACKGROUND OF THE INVENTION

1. Field of the Invention

The present invention relates to an edge detecting device which would be utilized for measurement of an object with respect to a characterizing item thereof, such as the shape or the gradient refractive index, wherein an optical signal including an optical image or shadow of the object is received and converted into an electric signal by an image pickup device, and on the basis of this electric signal, an edge, which is light-dark boundary contained in the optical signal from the object, or especially a plurality of edges is detected at a time by image processing.

2. Description of the Prior Art

Factories of these days, which are advanced in automation of production lines, adopt, for inspections, etc. of products, a large number of devices for detecting edges contained in images by processing these images. Further, these image detecting devices are used in a large number in instruments for optically measuring physical quantities. Since these edge detecting devices are adapted for edge detection in a contactless mode, they provide merits that objects to be measured are free from fear of injury and that they are easily compatible with the production lines which are fully automated so as to move products at very high speeds.

These edge detecting devices generally use an edge detecting means which performs gradient operation or Lapracian operation of images. Further it is known to use another edge detecting means which detects an edge by optically cutting off the zero order ray in the spatial frequency region. (See "A special frequency filter to remove zero Frequency", K. G. BIRCH, OPTICA ACTA, vol.15 No.2 p 113 to 127.)

Out of the edge detecting means mentioned above, the former means which performs the gradient operation or Lapracian operation allows, when an image is processed with no preliminary processing, noise components (high-frequency components) to be emphasized and is therefore adapted to perform the gradient operation or Lapracian operation of an image which has been smoothed. However, this means has a defect that it is incapable of detecting an edge accurately since an image is dulled by the smoothing.

Further, the latter means which cuts off the zero order ray in the spatial frequency region is optically composed so as to be capable of detecting an edge in two dimensions at a high speed. In actuality, however, this means can hardly detect an edge accurately due to the aberrations produced by the optical components comprised therein and misalignment of these components.

SUMMARY OF THE INVENTION

In view of the problems inherent in the conventional technology, it is a primary object of the present invention to provide an edge detecting device which is utilized for measurement of an object with respect to a characterizing item thereof such as the shape or the gradient refractive index, wherein an optical signal including an optical image or shadow of the object is received and converted into an electric signal by an image pickup device, and on the basis of this electric signal, an edge, which is a light-dark boundary contained in the optical signal from the object, or preferably a plurality of edges, is detected at one time and with high accuracy.

The edge detecting device according to the present invention comprises an image pickup unit comprising an image pickup device which receives light from an object and converts it into an electric signal as an image signal, a sampling means for converting the image signal into digital data, a Fourier transformation means for performing high-speed Fourier transformation of the digital data, a filtering means for cutting off at least the zero order spatial frequency component from the data having been subjected to Fourier transformation, an inverse Fourier transformation means for performing inverse Fourier transformation of the data obtained by the filtering means, a rough edge detecting means for simultaneously detecting information on rough locations of edges in the number corresponding to that of the edges contained in the edge information on the basis of the edge information on at least one edge, and an edge detecting means for calculating locations of the edges on the basis of correlation between the edge location data obtained by the Fourier transformation means and rough edge location information obtained by the rough edge detecting means.

Since the edge detecting device according to the present invention is adapted to electrically perform all of the Fourier transformation of the image data for detecting characteristics of the edges, the filtering of the spatial frequency obtained with the Fourier transformation within a predetermined region and the inverse Fourier transformation of the filtered data, the edge detecting device according to the present invention permits enhancing detecting accuracy thereof relatively easily by increasing number of data points to be inputted thereinto and can be manufactured at a relatively low cost.

This and other objects, as well as the features and advantages of the present invention, will become apparent from the following detailed description of the preferred embodiments when taken in conjunction with the accompanying drawings.

BRIEF DESCRIPTION OF THE DRAWINGS

FIG. 1A is a conceptual diagram illustrating the fundamental configuration of the edge detecting device according to the present invention;

DESCRIPTION OF THE PREFERRED EMBODIMENTS

Figure 1B:
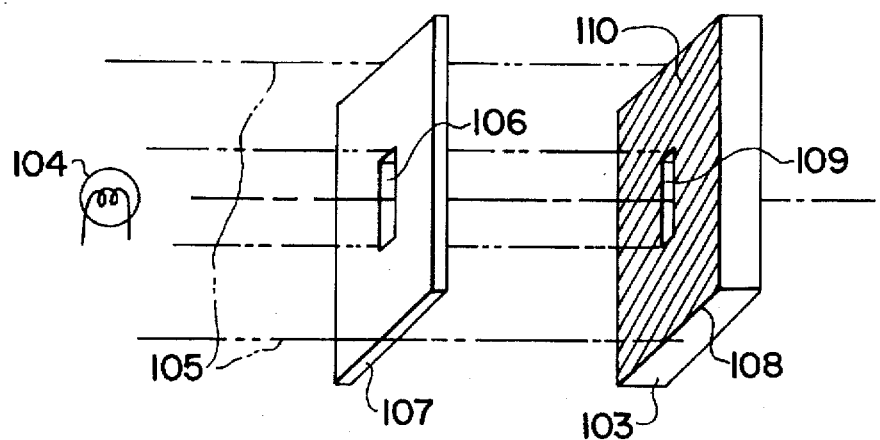
FIG. 1B is a diagram illustrating a fundamental shadow-projecting-type image pickup unit of the edge detecting device according to the present invention.

Configuration and functions of the edge detecting device according to the present invention will be described below with reference to FIGS. 1A and 1B.

In FIG. 1A, the reference numeral 101 represents a material which is the object of edge detection, the reference numeral 102 denotes an imaging lens and the reference numeral 103 is an image pickup device such as a CCD two-dimensional image sensor or a one-dimensional image sensor. The imaging lens 102 and the image pickup device 103 form an image pickup unit such as a CCD camera. The image pickup unit shown in FIG. 1A generates an image signal 1, as the imaging lens 102 forms an image of the object on the image pickup device 103, which performs photoelectric conversion of this optical information.

The image pickup unit according to the present invention does not necessarily employ a structure to form an image of the object; for example, a structure shown in FIG. 1B in which an object is inserted in parallel rays 105 from a light source 104 and the image pickup device 103 receives an optical information as a shadow of this object projected thereon may be adopted. FIG. 1B shows a slit element 107 having an opening 106. Parallel rays 105, rays incident on the surface of the slit element 107 cannot reach the receiving surface 108 of the image pickup device 103 such as a CCD image sensor, while rays passing through the opening 106 are incident on the receiving surface 108. As a result, the image pickup device receives a light-dark pattern including a bright area 109 and a dark area 110 projected as a shadow of the slit element 107. Thus, the image pickup unit shown in FIG. 1B does not require an imaging lens and consists essentially of an image pickup device. The light-dark pattern incident on the image pickup device 103 is converted into an electric signal as an image signal, in the same manner as in the image pickup unit according to FIG. 1A.

Reference will be made to FIG. 1A again. The reference numeral 2 designates a sampling means for converting the image signal 1 obtained from the image pickup unit into digital image data by periodically sampling the image signal 1. The reference numeral 3 denotes a Fourier transformation means for performing Fourier transformation of the sampled image data for conversion into quantities within the spatial frequency region, the reference numeral 4 represents a filtering means for electrically cutting off the spatial frequency component of at least the zero order ray from the data which has been subjected to the Fourier transformation, the reference numeral 5 designates an inverse Fourier transformation means for performing inverse Fourier transformation so as to resume the original spatial frequency data from the data from which the zero order ray has been cut off, the reference numeral 6 denotes a rough edge detecting means for detecting rough edge location of the object on the basis of the image signal 1, etc. obtained by the image pickup unit, and the reference numeral 7 represents an edge detecting means for detecting edge location information from the data obtained by the inverse Fourier transformation means on the basis of the rough edge location information.

The edge location information detected by the edge detecting means 7 is displayed for an observer utilizing a display unit 16 which shows the edge location of the object. A variety of display forms is possible; for example, a TV monitor displaying a picture of an object with the edge location superimposed thereupon, a monitor exhibiting the edge location in a form of a wave upon setting a coordinate axis representing positions on the object, or a monitor displaying the edge information as numerical data or a document would be employed. Alternatively, hard copy means such as a printer can be used as an output unit instead of the monitor.

It is conventionally known well that information obtained by subjecting image data optical Fourier transformation, filtering the image data within the spatial frequency region thereof and subjecting the image data further to the inverse Fourier transformation has an effect to strengthen or weaken a certain characteristic of the original information, and the means which was contrived by BIRCH et al and is mentioned above as the prior art is used for detecting the characteristic of edges by filtering the zero order ray. In order to detect the characteristic with higher accuracy by this type of data processing means, it is required to enhance filtering accuracy or alignment accuracy of the components used in an optical processing means. In contrast, the electrical processing means adopted for the edge detecting device according to the present invention permits easily enhancing the detecting accuracy simply by increasing number of data points to be inputted into the processing means.

Further, the electrical processing means adopted for the edge detecting device according to the present invention uses signal processing devices for Fourier transformation, etc. as well as an AD converter device and other devices which can process data at accelerated speeds and are available at low prices, and is therefore more advantageous from view point of manufacturing cost. When these points are taken into consideration, it is evident that the electrical data processing means which detects characteristic points by filtering the image data in the spatial frequency region in the edge detecting device according to the present invention is more advantageous.

Now, functions of the edge detecting device according to the present invention which has the configuration described above and is adapted to detect a single edge by electrically filtering image data within the spatial frequency range will be described below. For simplicity, description will be made by using only one-dimensional information selected out of the two-dimensional information shown in FIG. 1A.

When the image pickup device 103 receives an optical image or shadow or an object containing an edge and converts it into a continuous electric signal as the image signal 1, the sampling means 2 converts the image signal 1 into digital image data by sampling the image signal 1. The image data obtained through sampling is converted by the Fourier transformation means 3 into a form of the spatial frequencies, the spatial frequency component of the zero order ray is cut off by the filtering means 4 and the image data is subjected to inverse Fourier transformation by the inverse Fourier transformation means 5 for conversion into the original form of the data in the real space.

The image data from which the zero order ray has been cut off by the filtering means 4 as described above has a characteristic that a valley is formed at the location corresponding to an edge and two peaks are formed on both the sides of the valley, thereby permitting detecting the edge with high accuracy by detecting this valley. However, since the image of the object is sampled within a limited range and the obtained image data is affected by noise, valleys are formed not only at the location on the edge but also on both the ends of the image data range and at intermediate locations between each of these ends and the location of the edge. On the image data obtained by the inverse Fourier transformation means 5, sharp valleys are formed at the location of the edge to be detected and both the ends of the data range, whereas peaks are formed beside the valleys, and several peaks and valleys are formed alternately between the location of the edge and each of the ends as shown in FIG. 1A. It is therefore necessary to detect the location of the wanted edge out of these valleys.

Although it is easy to detect the location of the edge if the image data always exhibits a valley at the location of the edge which is deeper than the other valleys, the inventors have confirmed by simulation that valleys formed at locations of edges were not always deeper than valleys formed at other locations. Further, paying attention to the fact that a valley formed at an edge location has a high gradient, attempts were made by simulation to detect edge locations on the basis of gradient data obtained around the edges, but the valley formed at the location of an edge sometimes had a gradient which is lower than that of a valley formed at a location other than the edge location, indicating that this detecting method was undesirable.

In view of the results obtained by the simulation described above, the edge detecting device according to the present invention is adapted in such a manner that the edge detecting means 7 is capable of easily and accurately discriminating and detecting an edge located at correct location from a plurality of valleys formed in the data in the real space by using the data in the real space obtained by the above-described inverse Fourier transformation means 5 and the rough edge location information obtained with the rough edge detecting means 6.

The edge detecting device for detecting a single edge has the configuration and functions described above. In case where a plurality of edges are to be detected by the edge detecting device according to the present invention, the device has the configuration and functions which are similar to those described above. FIG. 1A shows an example where the image data contains information on two edges traced in the single dot and dash lines. After the image data is subjected to the inverse Fourier transformation by the inverse Fourier transformation means 5 in this example, the two edges form two valleys, and the rough edge detecting means 6 and the edge detecting means 7 simultaneously detect information containing two edges respectively. Therefore, the edge detecting device according to the present invention is capable of detecting locations of all edges simply and accurately.

The embodiments of the edge detecting device according to the present invention which are adapted to detect a single edge will be described below:

EMBODIMENT 1

Figure 2:
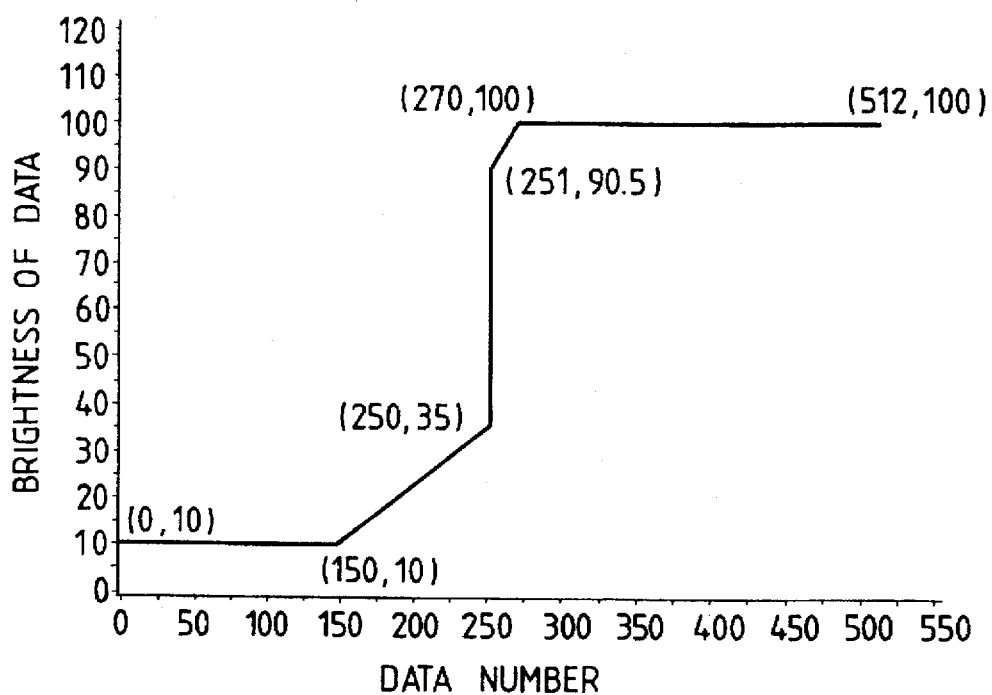
FIG. 2 is a graph illustrating data sampled in Embodiment 1 of the edge detecting device according to the present invention.

The Embodiment 1 was prepared for confirming whether or not the edge detecting device according to the present invention is actually effective and operated for detecting an edge while producing noise-free image data shown in FIG. 2 in a computer.

The Embodiment 1 is adapted in such a manner that the data processing to be performed by the Fourier transformation means 3 through the edge sampling means 7 is carried out in a computer which comprises an FFT processor board designed exclusively for high-speed Fourier transformation and high-speed inverse Fourier transformation.

The image data shown in FIG. 2 has been produced in the computer simulating data which would be obtained through sampling by the sampling means 2. This data consists of a train of 512 data elements and is graphically represented taking data element serial numbers as the abscissa and lightness as the ordinate. The former and the latter numerals given in each parenthesis represent the serial number and lightness respectively of a data element. On the image data shown in FIG. 2, lightness varies remarkably from a 250th data element to a 251st data element, indicating an edge to be detected. The image data shown in FIG. 2 is subjected to high-speed Fourier transformation in the FFT processor functioning as the Fourier transformation means 3 and converted into data within the spatial frequency region. Within this region, the image data is filtered by the filtering means 4 so as to zero the zero order ray and rays of tenth and higher orders, and then is returned to the data in the real space by carrying out the inverse Fourier transformation by the above-described processor board functioning as the inverse Fourier transformation means 5. The filtering to zero the rays of the tenth and higher orders is performed for preliminarily eliminating the high-frequency components which are to be detected as noise at the stage of edge detection.

Figure 3:
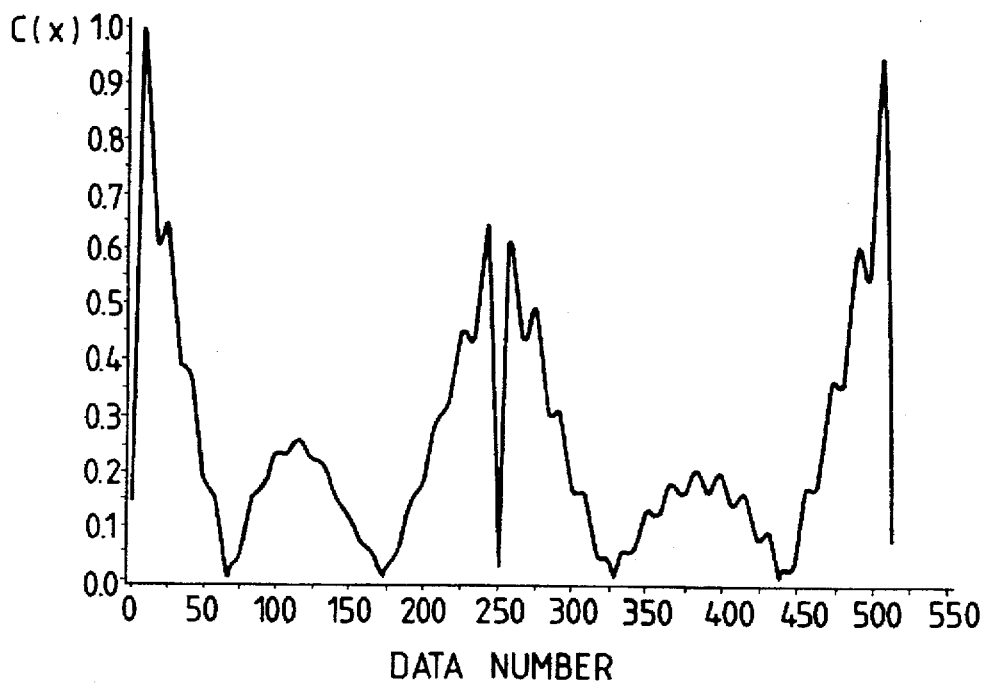
FIG. 3 is a graph illustrating data which has been subjected to the inverse Fourier transformation in the Embodiment 1 of the present invention.

The data obtained by processing the image data as described above is shown in FIG. 3. In this drawing, a valley is formed at the location corresponding to a 251st data element which is obtained from an edge. When the edge detecting device according the present invention is capable of discriminating this valley from the other valleys located at both the ends of the graph and intermediate locations, it can be said that the device has a capability to detect edge location accurately. In addition, the data shown in FIG. 3 has been normalized to a maximum lightness.

Figure 1C:
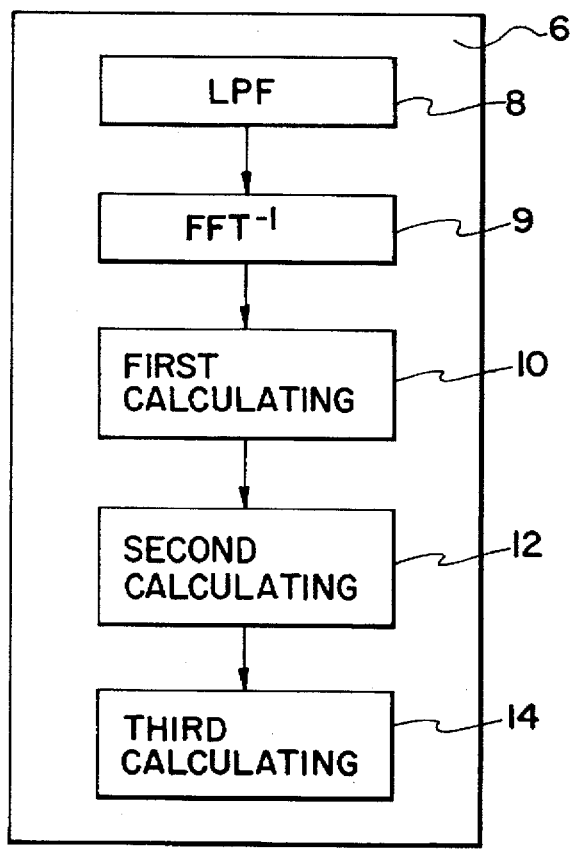
FIG. 1C is a schematic diagram illustrating a configuration of a rough edge detecting means shown in FIG. 1A.
Figure 4:
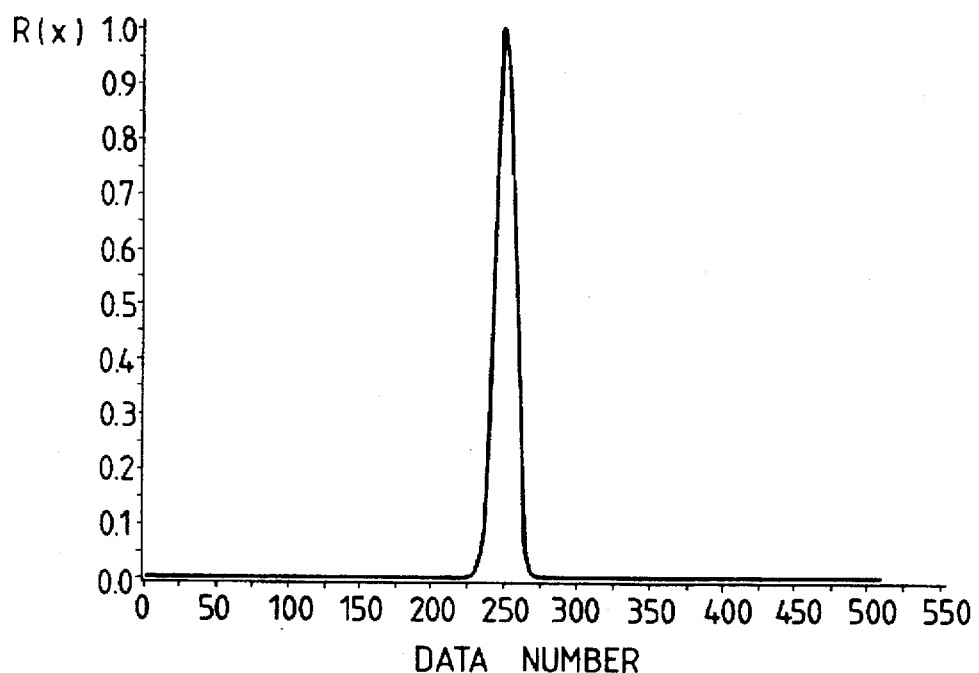
FIG. 4 is a diagram illustrating data of the rough edge information in the Embodiment 1 of the present invention.

Then, description will be made of the rough edge information to be detected by the rough edge detecting means 6 using FIG. 1C. First, the data in the spatial frequency region which is obtained through the Fourier transformation of the data shown in FIG. 2 by the Fourier transformation means 3 is stored as a primary data. After filtering the primary data so as to remove components representing rays of the fifth and higher orders therefrom by a low pass filter 8, a secondary data is prepared by performing the high-speed inverse Fourier transformation of the filtered data with the FFT processor board 9. By a first calculating element difference in value between each pair of data elements of the secondary data which are adjacent to each other is calculated and all differences are sequentially arranged to prepare another data train. At this point, values of 50 data elements arranged on each ends of this data train are zeroed by second calculating element 12, and the each value of resultant train of data elements is raised to the sixth power by third calculating element 14, whereby the data shown in FIG. 4 to be used as the rough edge information is obtained. In FIG. 4, the data is normalized to a maximum value and a 250th data element forms a peak which is to be used for detecting rough location of an edge. The edge detecting means 7 detects the edge by correlating a function R(x) (the reference symbol x represents serial number of data element) of the rough edge information shown in FIG. 4 provided from the rough edge detecting means 6 with a function C(x) of the data shown in FIG. 3 obtained with the inverse Fourier transformation means 5. Specifically, a positive peak appears accurately at the location of the edge by performing a calculation of R(x)/C(x) since a positive peak is formed roughly at the location of the edge in R(x) and a negative peak, i.e., a valley is formed at the location of the edge in C(x).

Figure 5:
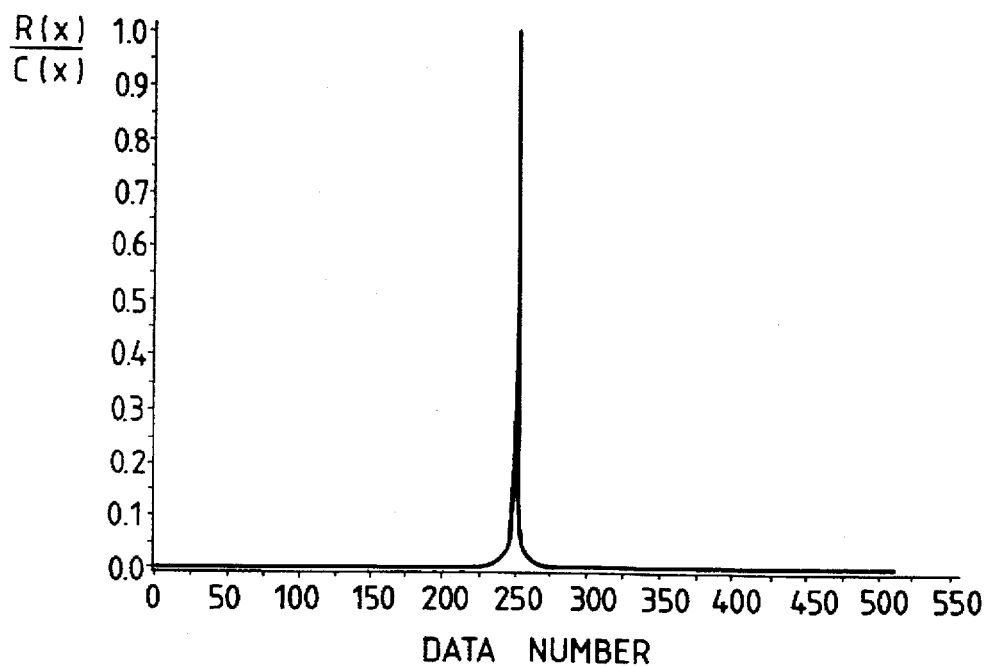
FIG. 5 is a diagram illustrating data indicating an edge location in the Embodiment 1 of the present invention.

The data obtained by this calculation is illustrated in FIG. 5 (normalized to a maximum value), wherein a positive peak appears at a 251st data element to prove the accurate edge location detecting capability of the edge detecting device preferred as the Embodiment 1 of the present invention.

This ultimate edge information is displayed by display means in a predetermined form as described above with respect to FIG. 1A.

EMBODIMENT 2

The second embodiment has a configuration from Fourier transformation means 3 to the display unit which is the same as the Embodiment 1.

Figure 6:
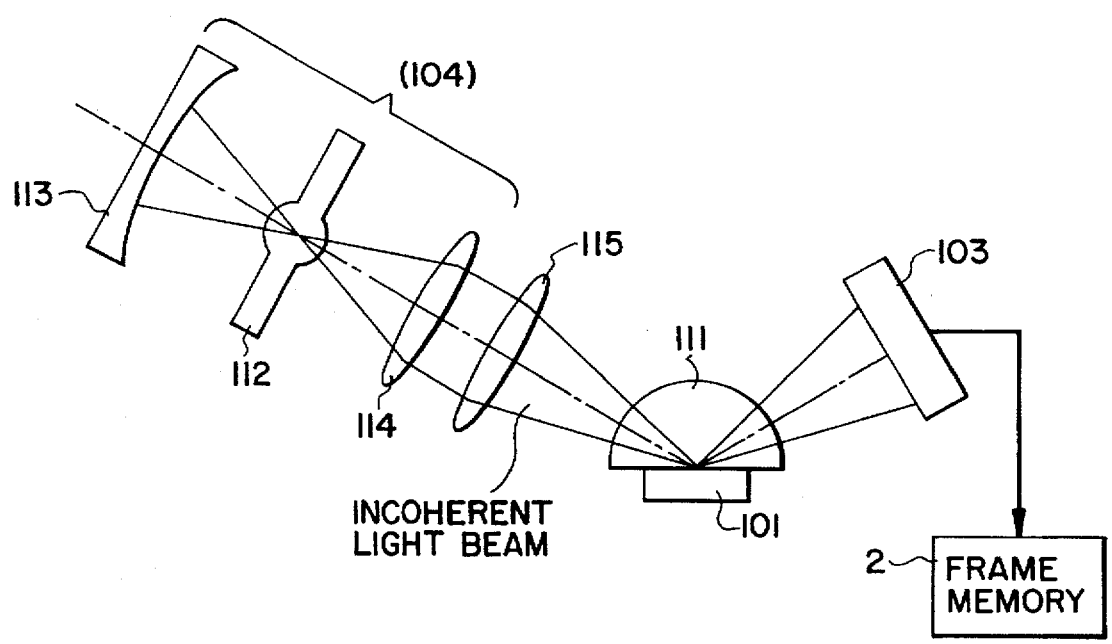
FIG. 6 is a schematic diagram mainly illustrating optical components according to Embodiment 2 of the present invention disposed before the image pickup unit.

In the Embodiment 2, a shadow-projecting-type image pickup unit is employed. A specific structure of an optical system disposed before the image pickup unit is shown in FIG. 6. A plane glass plate having a gradient refractive index is chosen as an object 101. A hemispherical lens 111 is disposed on the object 101 in such a manner that the plane surface thereof is contacted with the object 101. Incoherent light beam from light source means 104 is rendered incident obliquely on the object 101 as a converging bundle of rays, and resulting reflected light is incident on an image pickup device 103. The light source means 104 comprises Hg-Xe lamp 112, a concave reflecting mirror 113 for directing light emitted by the lamp 112 in multiple directions toward a single side of the lamp 112 and a fused silica (collimating) lens 114 for making the light from the lamp 112 into an incoherent light beam. A converging lens 115 is provided to converge the light from the light source means 104.

Information about the edge of the object 101 so transmitted to the image pickup device 103 as described above is converted thereby into an electric image signal which is sent to a frame memory 2 such as a IC memory providing a sampling means. As a result of sampling in the frame memory 2, image data including a train of 512 data elements as shown in FIG. 7 is obtained.

Figure 8:
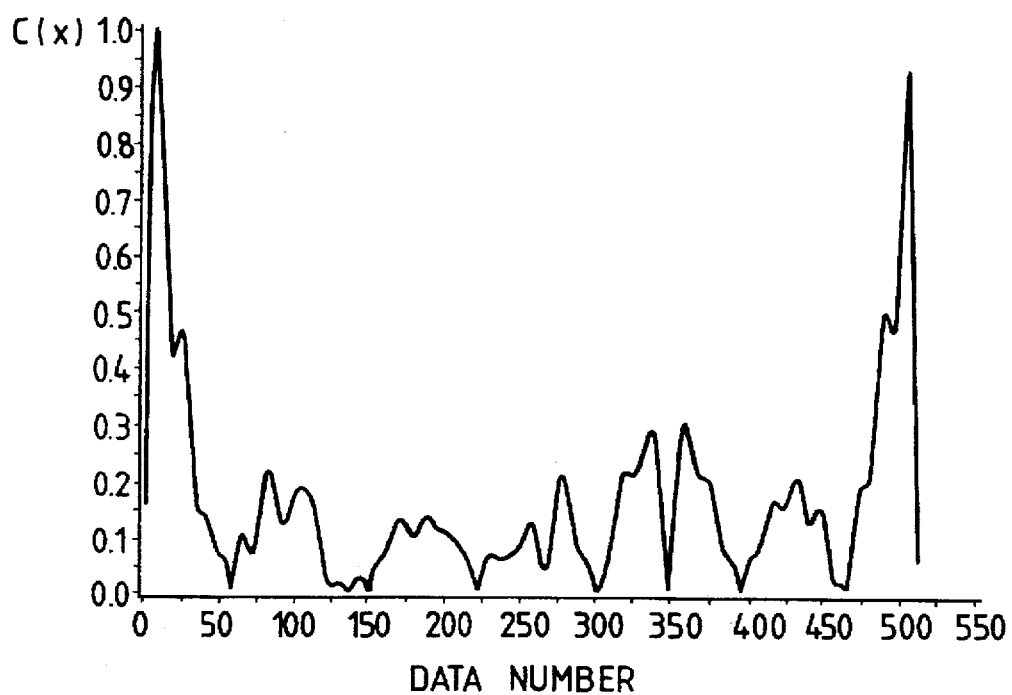
FIG. 8 is a graph illustrating data which has been subjected to the inverse Fourier transformation in the Embodiment 2 of the present invention.

This image data is subjected to the high-speed Fourier transformation, filtering and high-speed inverse Fourier transformation by the means 3, 4 and 5 which are the same as those used in the Embodiment 1, whereby the data shown in FIG. 8 is obtained. Further, the rough edge detecting means 6 detects rough edge information shown in FIG. 9 through the data processing described above with reference to the Embodiment 1. The edge detecting means 7 calculates the image data shown in FIG. 8 and the rough edge information shown in FIG. 9 as described above with reference to the Embodiment 1, thereby providing the result illustrated in FIG. 10.

This ultimate edge information is displayed by display means in a predetermined form as described above with reference to FIG. 1A.

Figure 7:
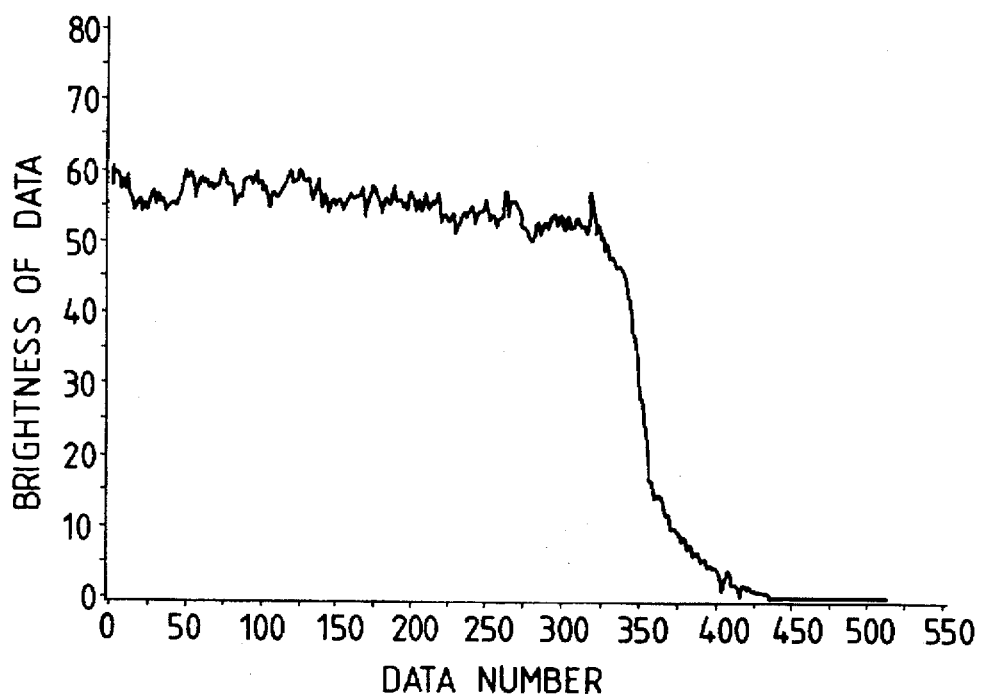
FIG. 7 is a graph illustrating data sampled in Embodiment 2 of the edge detecting device according to the present invention.
Figure 9:
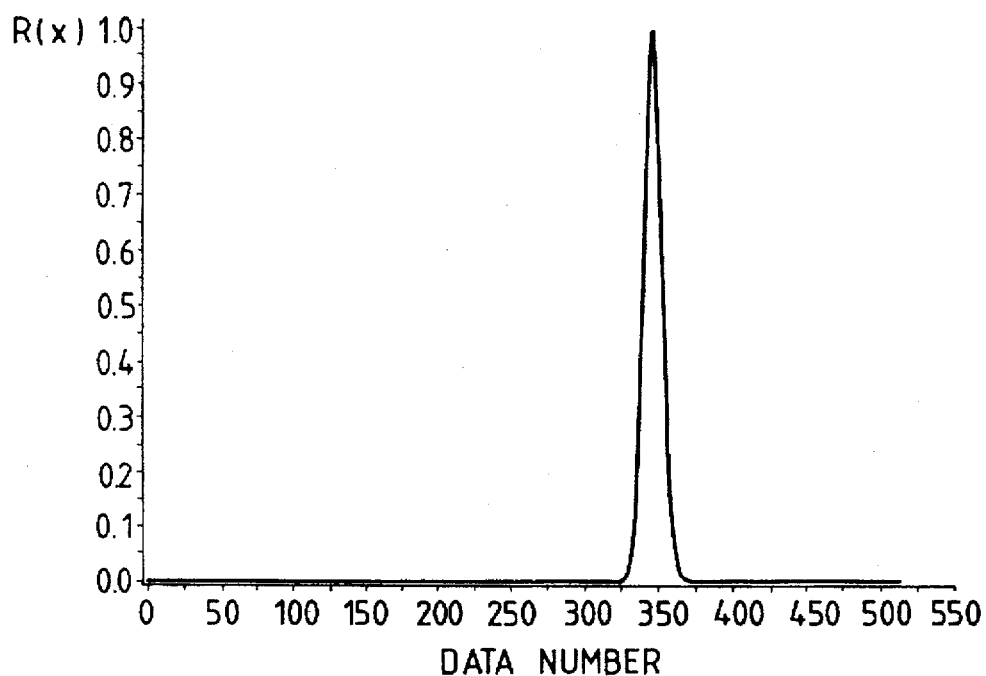
FIG. 9 is a curve illustrating data of rough edge information in the Embodiment 2 of the present invention.
Figure 10:
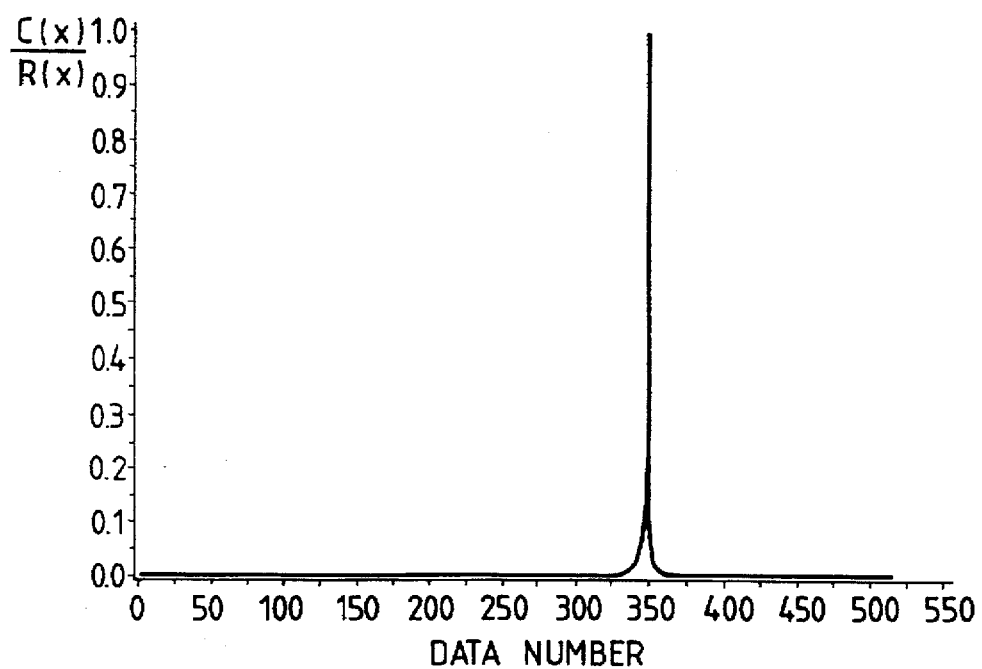
FIG. 10 is a curve illustrating data indicating an edge location in the Embodiment 2 of the present invention.

It will be understood that the Embodiment 2 is capable of recognizing peak appearing at a 349th data element and is capable of detecting an edge by using the data shown in FIG. 10 with accuracy higher than that obtainable by using the data shown in FIG. 7. The data shown in FIG. 8 through FIG. 10 are normalized to maximum values.

EMBODIMENT 3

The Embodiment 3 has the same configuration as that of the Embodiment 2, except for the filtering means 4 which is adapted to zero only components representing the zero order ray within the spatial frequency region in the Embodiment 3. Though the Embodiments 1 and 2 described above are adapted to zero also the rays of higher orders (the high-frequency components) for eliminating noise which hinders the edge detection, it is originally sufficient to eliminate only components representing the zero order ray as in the case of the Embodiment 3.

Figure 11:
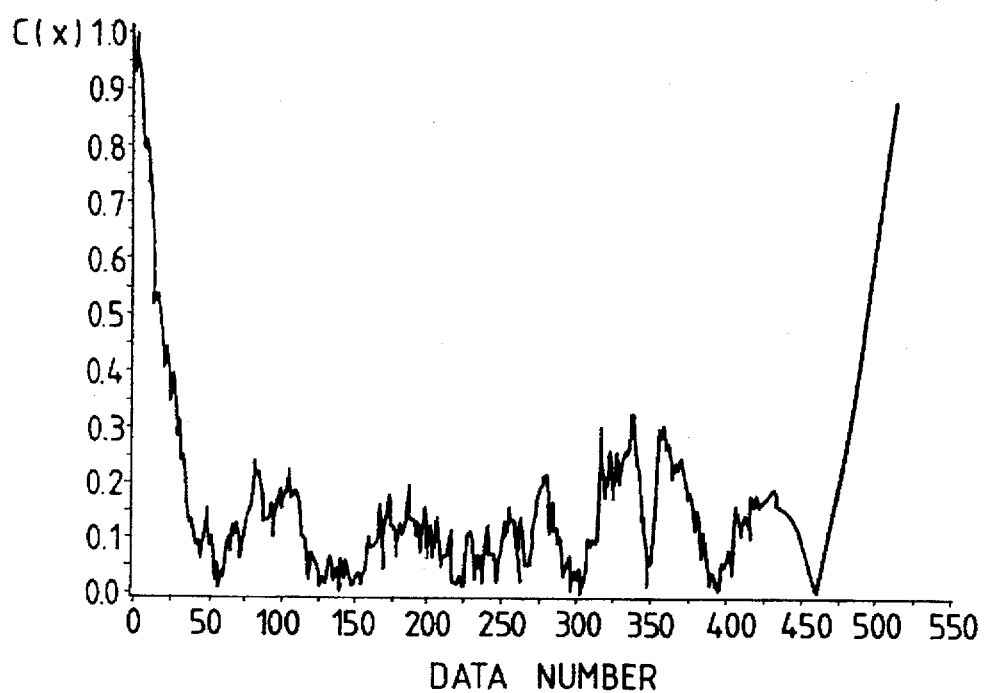
FIG. 11 is a diagram illustrating data sampled in Embodiment 3 of the edge detecting device according to the present invention.
Figure 12:
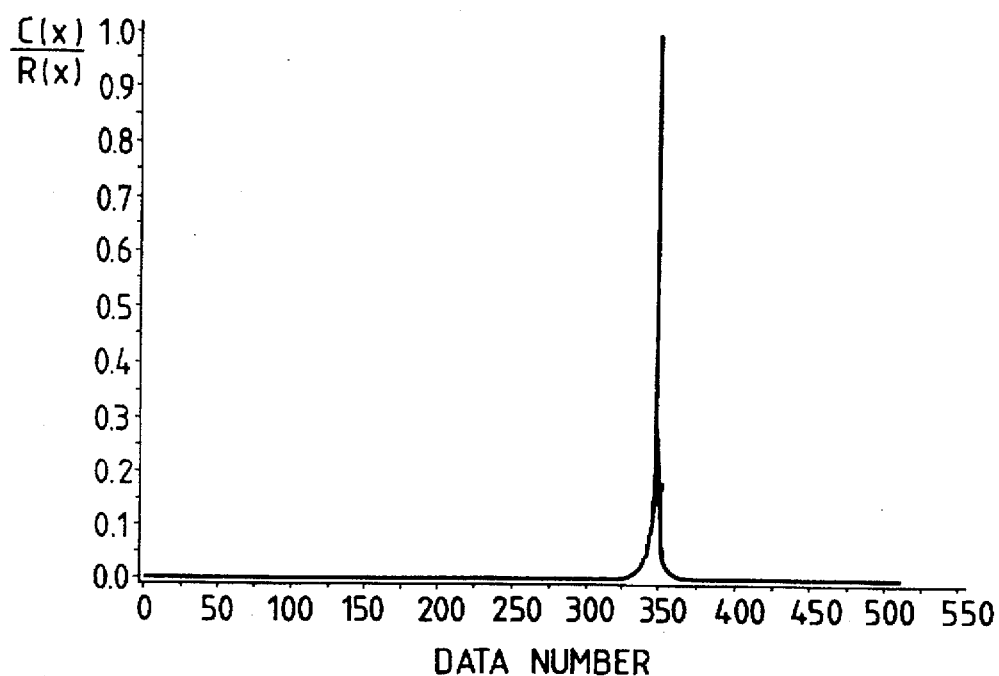
FIG. 12 is a diagram illustrating data indicating in edge location in the Embodiment 3 of the present invention.

The image data selected for edge detection by the Embodiment 2 is processed by the Embodiment 3 which has the configuration described above. In this case, the data shown in FIG. 11 is obtained after the high-speed inverse Fourier transformation by the inverse Fourier transformation means 5, and the calculation of this data and the rough edge information performed by the edge detecting means 7 provides the data shown in FIG. 12. This ultimate edge information is displayed by display means in a predetermined form as described above with reference to FIG. 1A. Like FIG. 10, FIG. 12 indicates a peak at a 349th data element, thereby proving that the Embodiment 3 is capable of detecting an edge accurately. On the data shown in FIG. 12, however, noise components are visible on both the sides of the peak indicating the location of the edge. In order to eliminate the components causing errors as completely as possible or detect an edge as accurately as possible, it is therefore preferable to eliminate the high frequency components, i.e., the rays of higher orders in addition to the zero order ray, by using the filter means 4 as in the case of the Embodiment 1 or 2. The data shown in FIG. 11 and FIG. 12 is normalized to the maximum values.

EMBODIMENT 4

Figure 13:
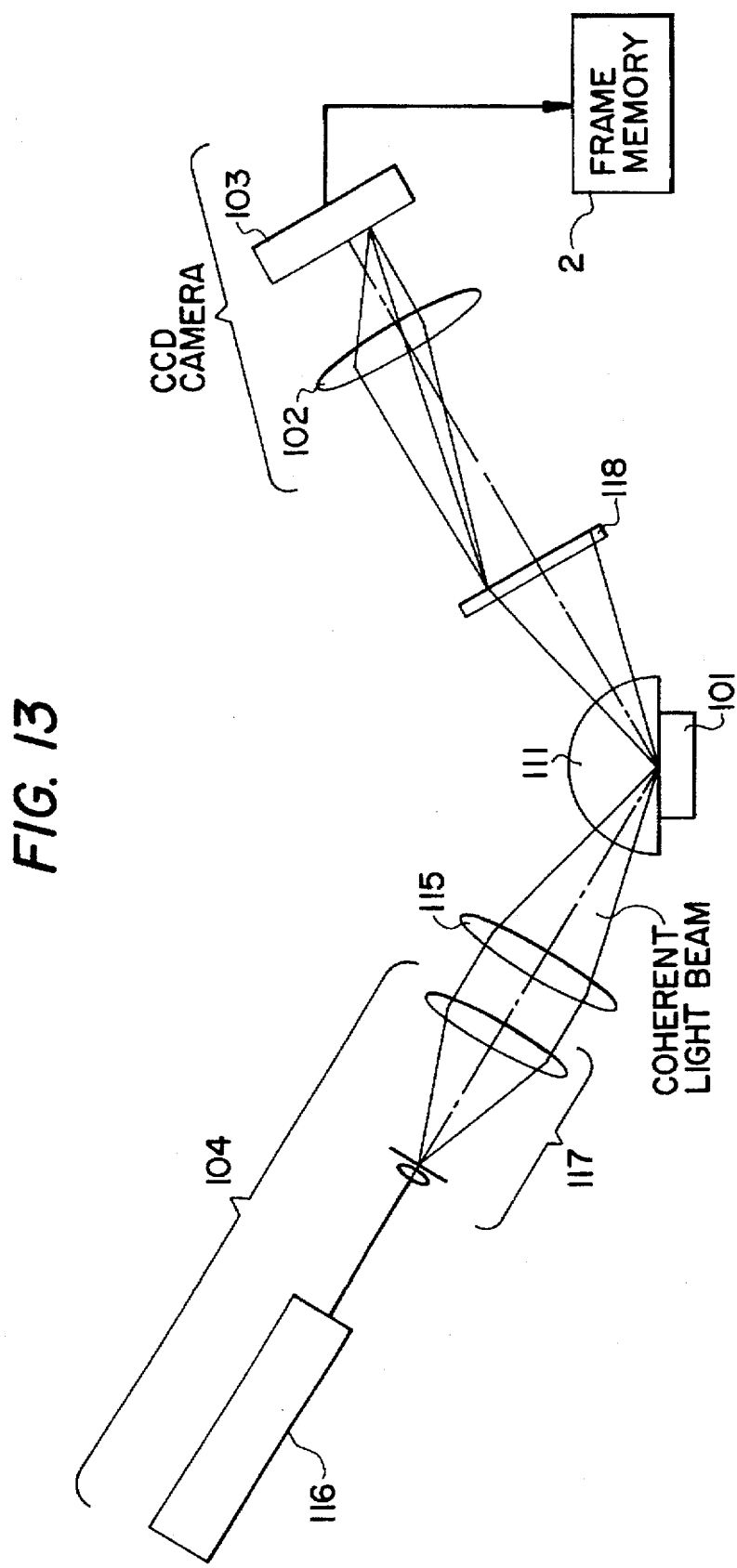
FIG. 13 is a schematic diagram mainly illustrating optical components according to Embodiment 4 of the present invention disposed before the image pickup unit.
Figure 14:
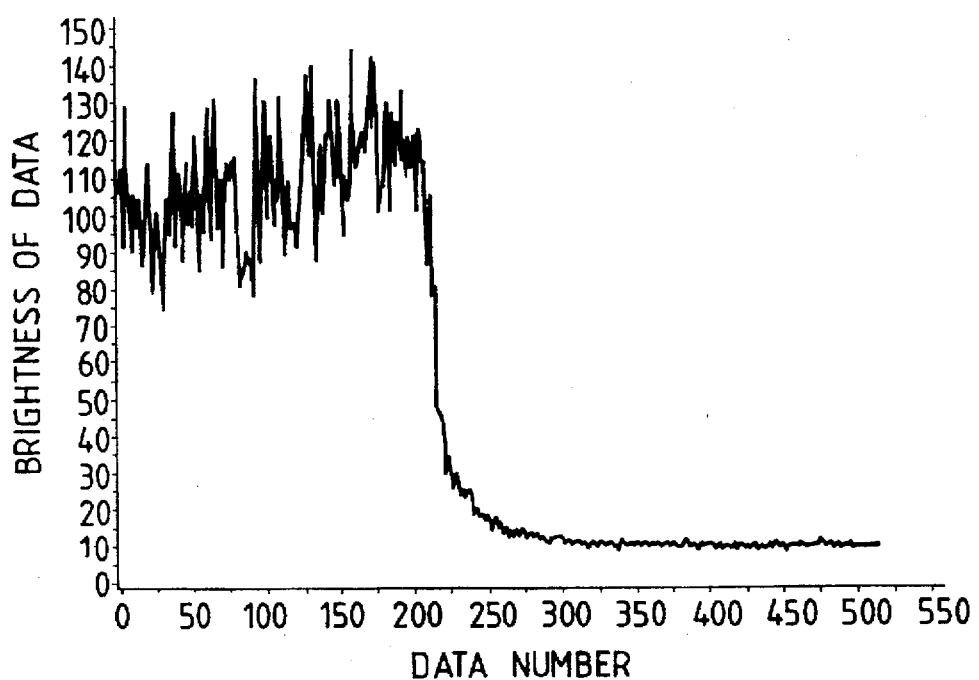
FIG. 14 is a graph illustrating data sampled in Embodiment 4 of the edge detecting device according to the present invention.

In the Embodiment 4, an image-forming-type image pickup unit such as a CCD camera is employed. A specific structure of an optical system disposed before the image pickup unit is shown in FIG. 13. An object 101, a hemispherical lens 111 and a converging lens 115 are arranged in the same way as in Embodiment 2. A light source means 104 comprises a laser light source 116 as a source of coherent light and a beam expander 117 for expanding beam width of the coherent light beam emitted from the laser light source 116. The light from the light source means 104 is reflected on the object 101 and then incident on a diffuser 118. An image signal is obtained by the image pickup unit comprising an imaging lens 102 and a CCD image sensor, as light passing through the diffuser 118 is imaged on the CCD frame image sensor by the imaging lens 102. The image signal is sampled by a frame memory, thereby the data shown in FIG. 14 is obtained. This data is a typical example of image data which contains multiple speckles produced by noise.

Figure 15:
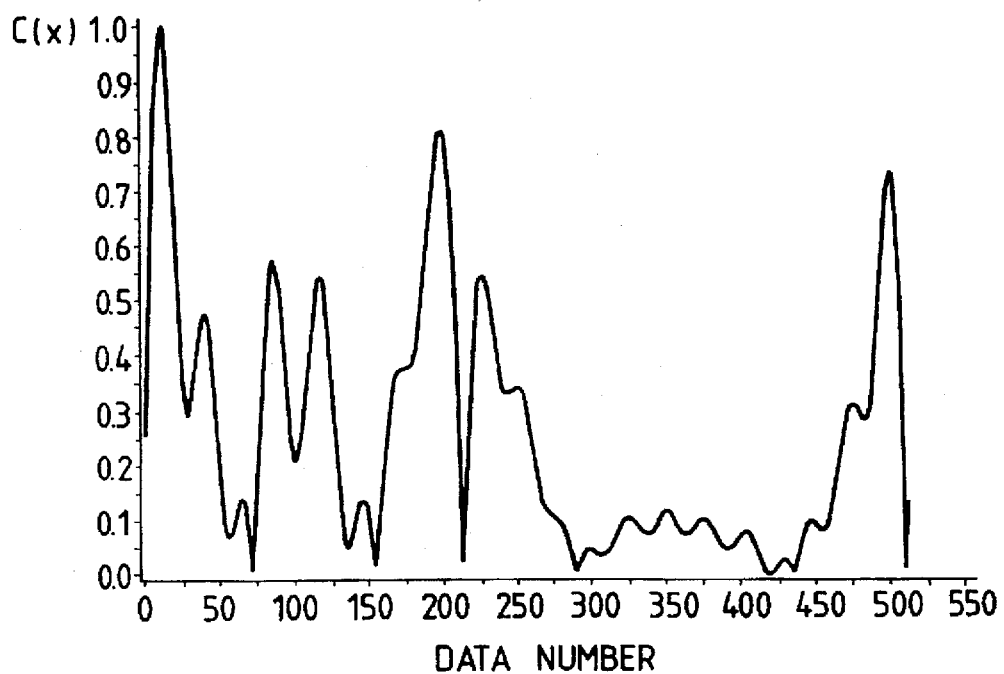
FIG. 15 is a graph illustrating data which has been subjected to the inverse Fourier transformation in the Embodiment 4 of the present invention.

Further, the Embodiment 4 adopts the Fourier transformation means 3 and the inverse Fourier transformation means 5 which are the same as those used in the Embodiments described above. The filtering means 4 adopted for the Embodiment 4 is adapted to zero the zero order ray as well as the rays of the sixth and higher orders. By subjecting the data obtained by sampling as shown in FIG. 14 to the Fourier transformation, filtering and the inverse Fourier transformation as in the cases of the above-described Embodiments, data shown in FIG. 15 is obtained.

Figure 16A:
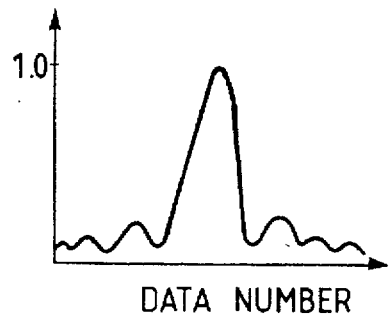
FIGS. 16A through 16E are diagrams descriptive of the processes to detect rough edge information in the Embodiment 4 of the present invention.
Figure 16B:
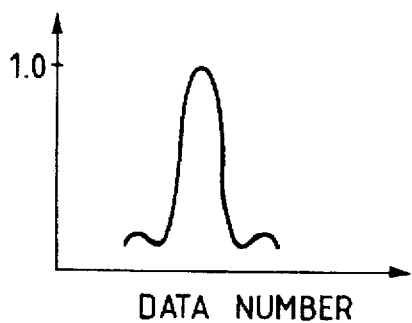
Figure 16C:
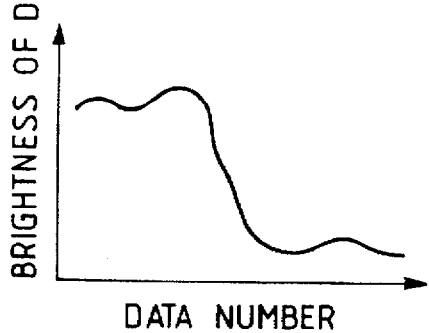
Figure 16D:
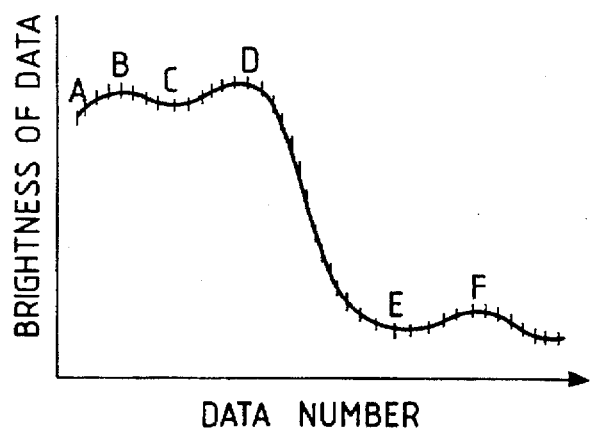
Figure 16E:
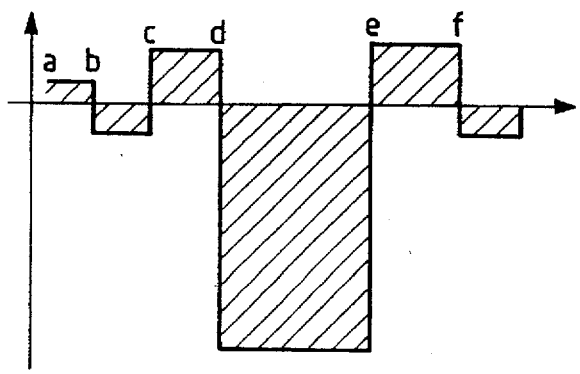
Figure 17:
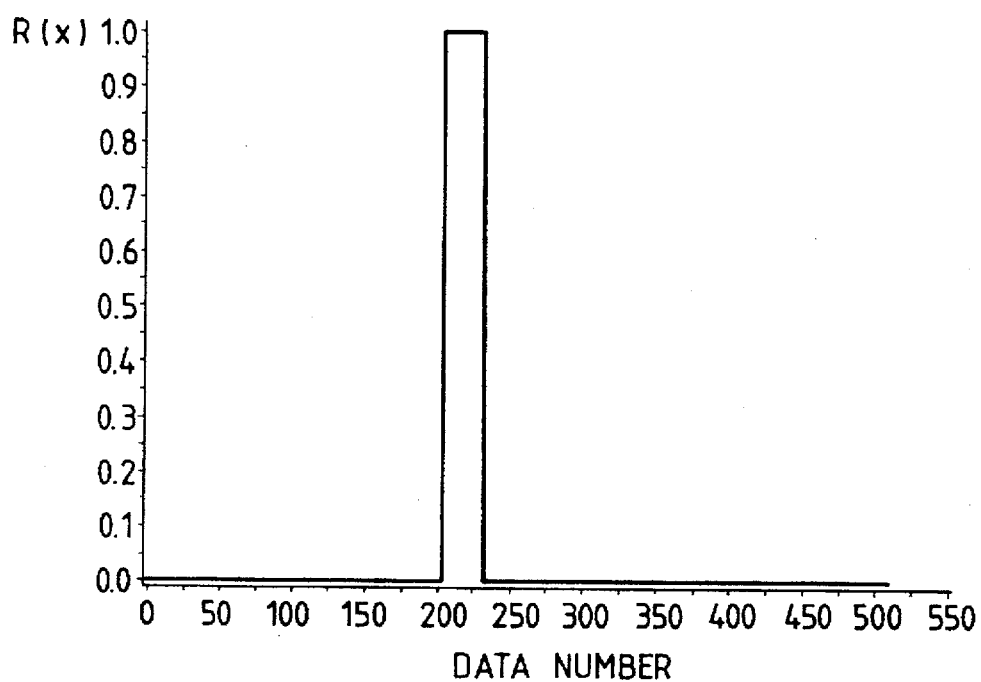
FIG. 17 is a diagram illustrating data of the rough edge information in the Embodiment 4 of the present invention.

Differently from the cases of the Embodiments 1 through 3 described above, the rough edge detecting means 6 adopted for the Embodiment 4 detects rough edge information in the processes which are described below with reference to FIG. 16A through FIG. 16E. Fourier transformation of the data shown in FIG. 14 provides the data within the spatial frequency region shown in FIG. 16A. Since image data obtained by the sampling means 2 generally contains noise signals in many cases (as shown in FIG. 14) and makes it difficult to detect a rough location of an edge, it is necessary to preliminarily cut off the high-frequency components. In the Embodiment 4, the high-frequency components or the rays of the fifteenth and higher orders are cut off from the data shown in FIG. 16A (see FIG. 16B) and the resultant data is subjected to the inverse Fourier transformation, whereby the data shown in FIG. 16C (corresponding to the data shown in FIG. 14) is obtained. This data consists of a train of 512 data elements which are plotted as shown in FIG. 16D. A difference between each pair of data elements which are adjacent to each other is calculated, for example, in the rightward order and values of the differences are totalized within a range where sign of the differences remains unchanged (section A–B). Within the next section where the differences have the reverse sign, values of the differences are totalized (section B–C). Such totalization is repeated over the entire range of the data. The totalized sums are represented in FIG. 16E wherein the sum of the differences in the section A–B corresponds to a–b, the sum of the differences in the section B–C corresponds to b–c, and so on. When the sums of the differences are raised to tenth power (or another higher power), the sums other than d–e can approximately be regarded as zero, thereby providing the rough edge information shown in FIG. 17.

Figure 18:
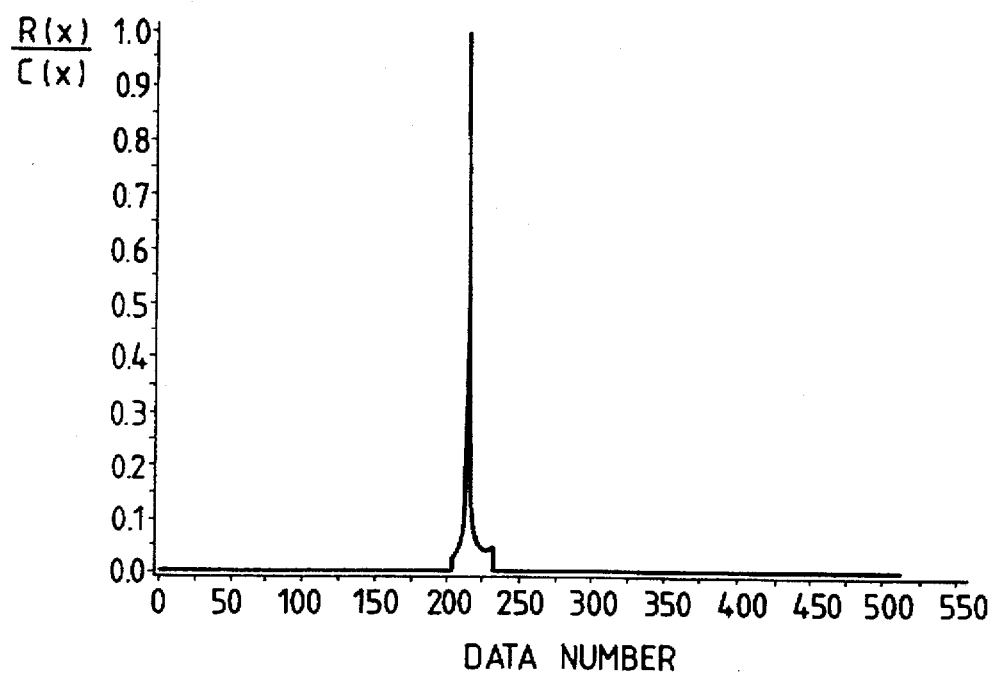
FIG. 18 is a curve illustrating data indicating an edge location in the Embodiment 4 of the present invention.

The rough edge information thus obtained consists of rectangular data sections which are free from noise and roughly indicate, as a location of an edge, the peak which has the highest gradient gradually varying on the original curve. The edge detecting means 7 calculates this rough edge information and the data shown in FIG. 15 which is obtained by the inverse Fourier transformation so as to correlate both the data through the processing similar to that performed in the Embodiments described above, and provides the data illustrated in FIG. 18. This ultimate edge information is displayed by display means in a predetermined form as described above with reference to FIG. 1A. FIG. 18 indicates a peak at a 214th data element and clarifies that the edge detecting device preferred as the Embodiment 4 of the present invention is capable of accurately detecting an edge. In addition, all the data shown in FIG. 15, FIG. 16A, FIG. 16B, FIG. 17 and FIG. 18 are normalized to maximum values.

Described above are the Embodiments of the edge detecting device according to the present invention which are adapted to detect a single edge. The embodiments which are designed to detect two edges at the same time will be described below with reference to FIG. 19 through FIG. 31.

EMBODIMENT 5

Figure 19:
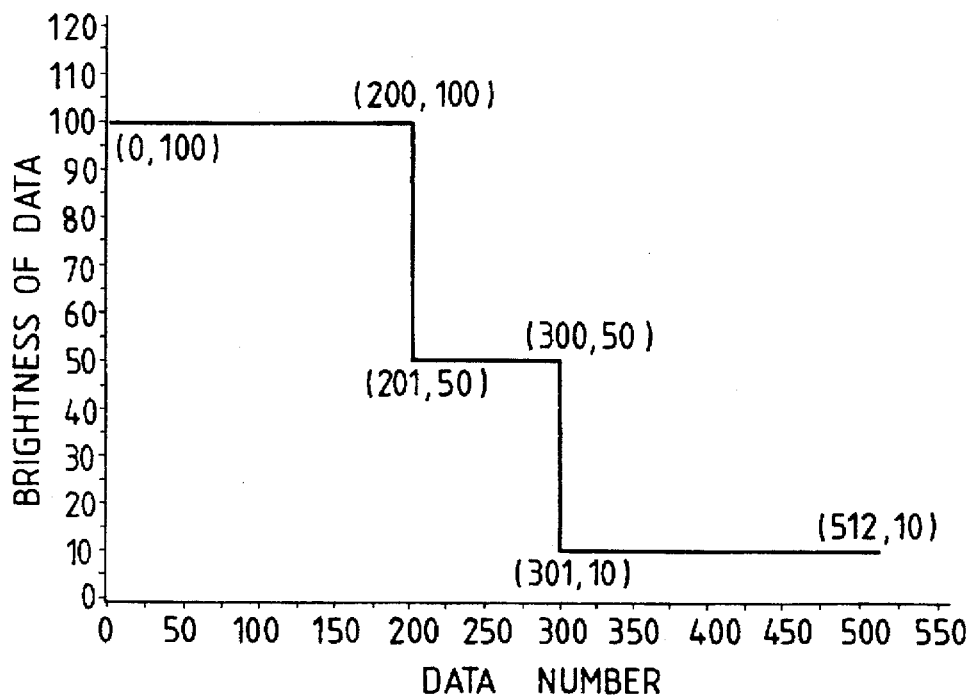
FIG. 19 is a diagram illustrating data sampled in Embodiment 5 of the edge detecting device according to the present invention.

FIG. 19 shows data which are obtained through periodical sampling by the sampling means 2. This data consists of a train of 512 data elements, like that used in the Embodiment 1, and is represented on a coordinates system for which data element serial number is taken as the abscissa and lightness is taken as the ordinate, the former and the latter numerals given in each parenthesis indicating serial number and lightness respectively of a data element. In FIG. 19, lightness varies remarkably from a 200th data element to a 201st data element and from a 300th data element to a 301st data element respectively to indicate two edges to be detected. The data shown in FIG. 19 is subjected to the Fourier transformation by the Fourier transformation means 3 for conversion into data within the spatial frequency region, filtered by the filtering means 4 for cutting off components representing the zero order ray and the rays of the tenth and higher orders, and subjected to the inverse Fourier transformation by the inverse Fourier transformation means 5 for returning to the data in the real space. The reason for cutting off the rays of the tenth and higher orders by the filtering means 4 is to preliminarily eliminate the high-frequency components which produce noise at the stage of edge detection.

Figure 20:
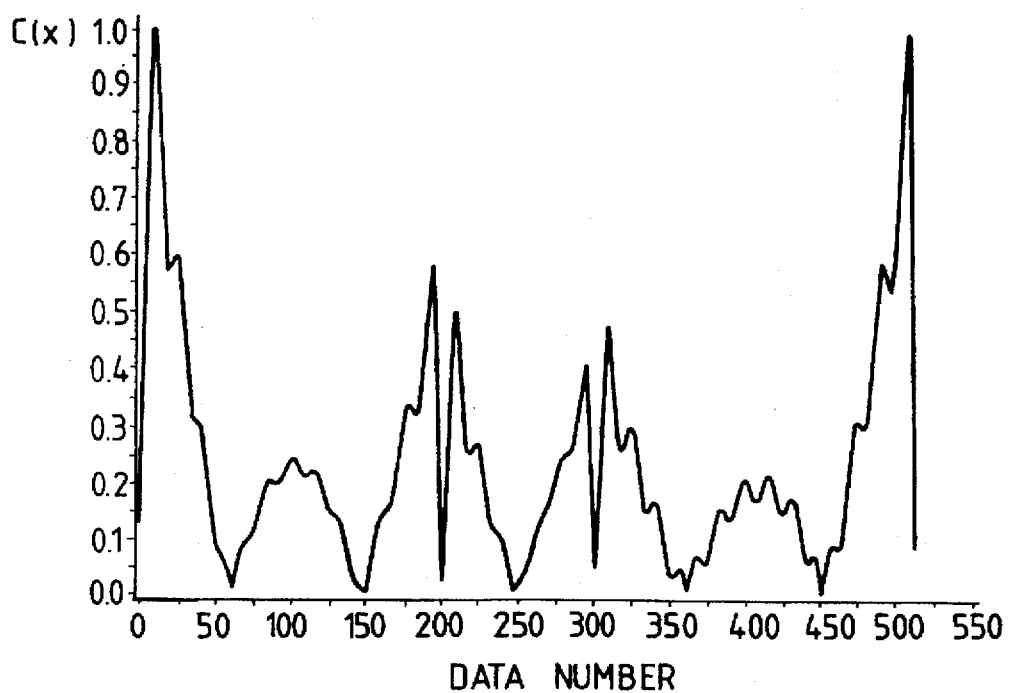
FIG. 20 is a curve illustrating data which has been subjected to the inverse Fourier transformation in the Embodiment 5 of the present invention.

The data thus obtained is illustrated in FIG. 20. In FIG. 20, valleys are formed at a 200th data element and a 300th data element respectively, and it can be said that the Embodiment 5 is capable of accurately detecting these edges when it discriminates these valleys from the valleys located on both the ends of the data train and those formed at the intermediate locations. The data shown in FIG. 20 is normalized to a maximum value.

Then, description will be made on the rough edge information to be detected by the rough edge detecting means 6. The data subjected to the Fourier transformation by the Fourier transformation means 3 is filtered to cut off components representing the rays of the fifth and higher orders, and then is subjected to the inverse Fourier transformation for obtaining data in the real space. For each data element having a certain serial number, of this data obtained by the inverse Fourier transformation, a difference in value from a data element adjacent thereto is calculated to be a value of a difference data element having the same serial number as that stated above, and a difference data including a train of difference data elements is prepared by arranging all these different data element sequentially. After zeroing values of 50 difference data elements arranged about each end of the train for preventing edges to be detected on both the ends of the train of data elements, each of the values of the resultant train of difference data elements is squared. Assuming that centers of edges are roughly located at data elements which have the largest peak value and the second largest peak value, 10 each of data elements neighboring each side of each of the data elements, intended to indicate edges, are stored as effective data elements to be used as the rough edge information and values of the rest of the data elements are regarded as zero. The rough edge information detected by the method described above is illustrated in FIG. 21, wherein the highest peak value and the second highest peak value are detected at a 200th data element and a 300th data element respectively. The data shown in FIG. 21 is normalized to the maximum value.

Figure 21:
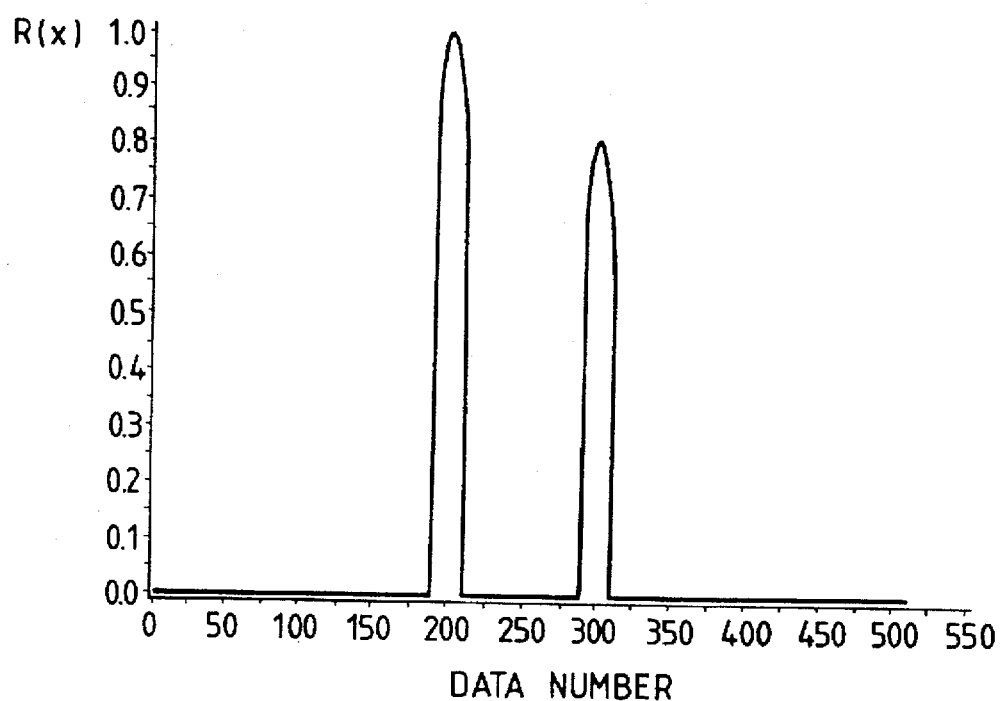
FIG. 21 is a graph illustrating data of rough edge information in the Embodiment 5 of the present invention.

The edge detecting means 7 detects the edges by correlating the function R(x) of the rough edge information obtained by the rough edge detecting means 6 shown in FIG. 21 and the function C(x) of the data obtained by the inverse Fourier transformation means 5 shown in FIG. 20. Specifically, positive peak values are obtained at correct edge locations by performing a calculation of R(x)/C(x) since R(x) gives positive peak values roughly at the locations of the edges and C(x) gives negative peak values or valleys at the locations of the edges.

Figure 22:
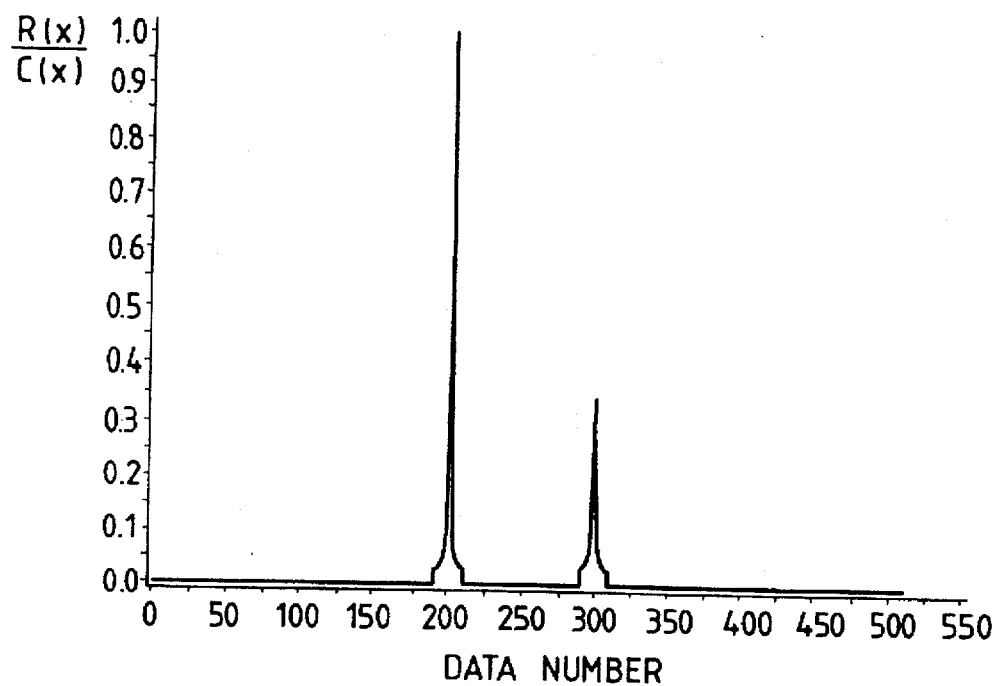
FIG. 22 is a diagram illustrating data indicating edge locations in the Embodiment 5 of the present invention.

The data obtained by the calculation is shown in FIG. 22 (normalized to a maximum value), wherein positive peak values appear on a 200th data element and a 300th data element to prove that the Embodiment 4 is capable of accurately detecting two peaks at the same time.

This ultimate edge information is displayed by display means in a predetermined form as described above with reference to FIG. 1A.

EMBODIMENT 6

Figure 23:
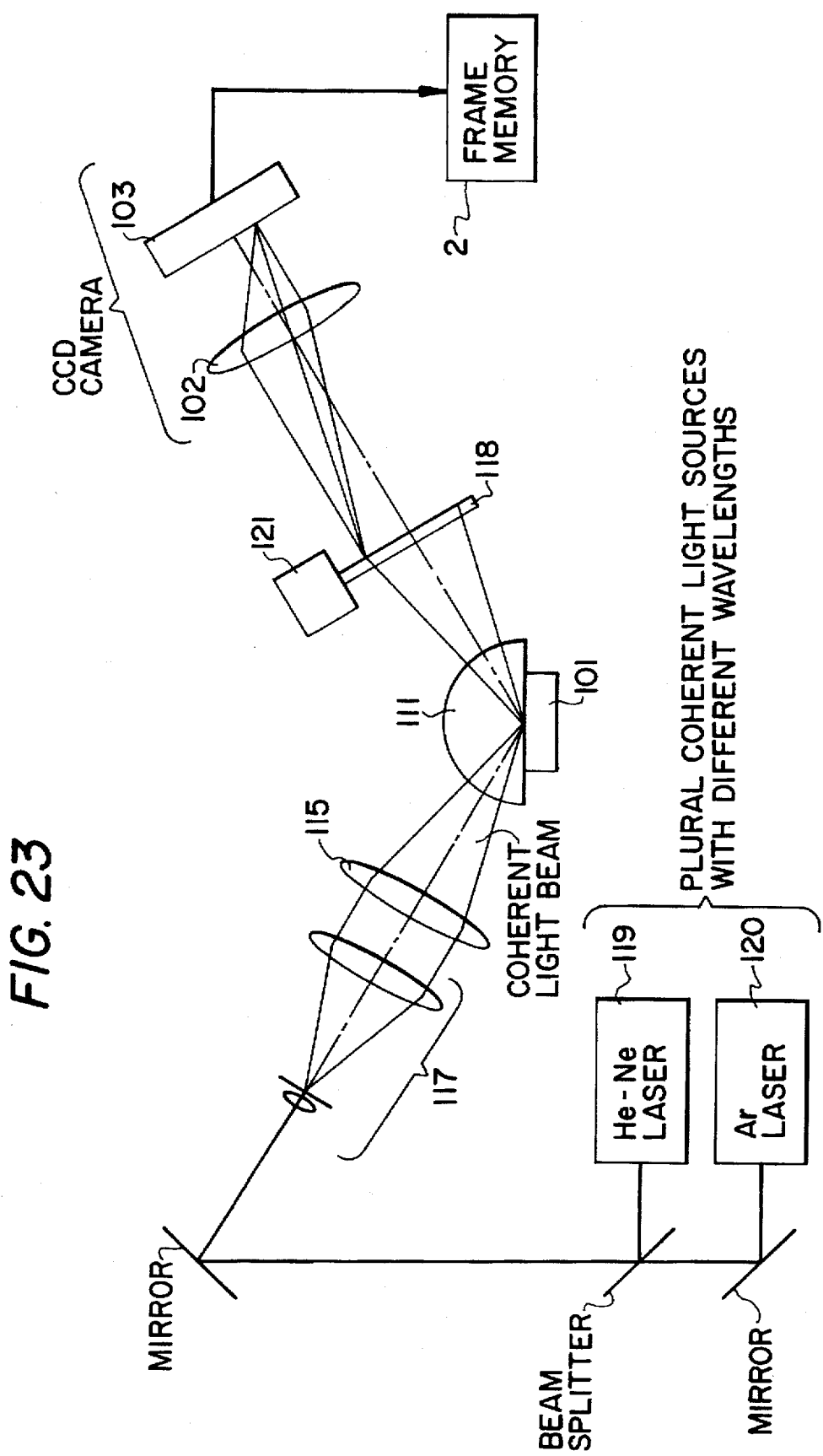
FIG. 23 is a schematic diagram mainly illustrating optical components according to Embodiment 6 of the present invention disposed before the image pickup unit.

As for a CCD camera as an image pickup unit and optical components disposed therebefore and a frame memory as sampling means, the Embodiment 6 discloses essentially the same structure as that of the Embodiment 4, except for light source means 104 as shown in FIG. 23. The difference in light source means exists in that according to the Embodiment 6, a He-Ne laser source 119 and a Ar laser source 120 are employed as sources of laser beams, which are combined by a beam splitter to be incident on an object.

Additionally, according to the Embodiment 6, a diffuser 118 is revolved around an optical axis by diffuser driving means such as a motor 121. As a result of revolving, noise contained in an edge information from the object 101 can be reduced.

Figure 24:
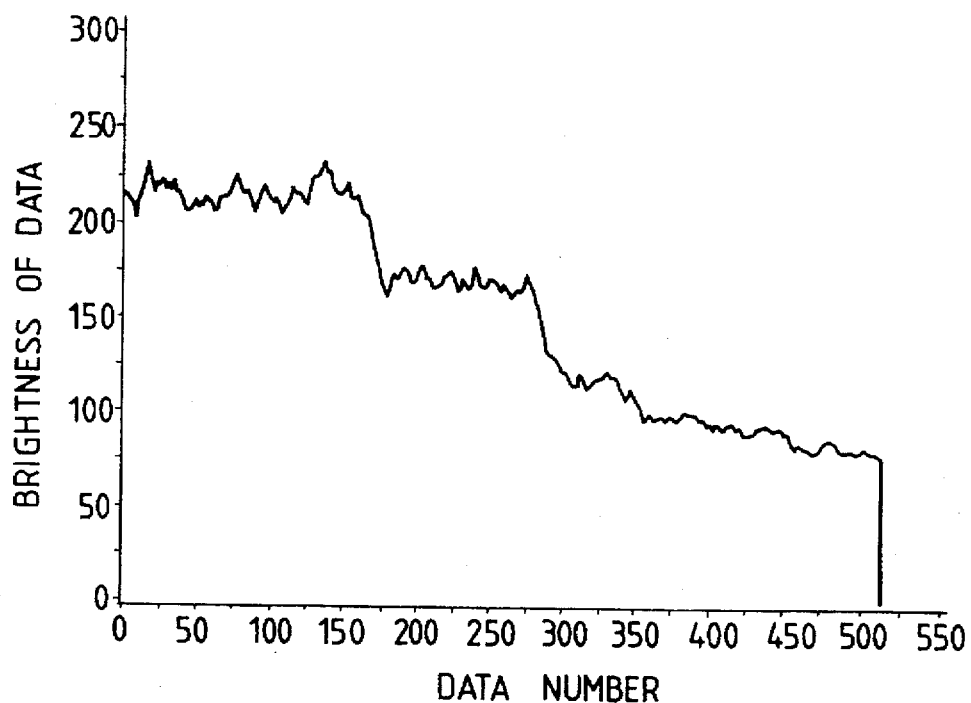
FIG. 24 is a diagram illustrating data sampled in Embodiment 6 of the edge detecting device according to the present invention.

An image signal is produced by the CCD camera and then sampled by the frame memory 2 to obtain image data as described above with reference to the Embodiment 4. The image data obtained by sampling consists of a train of 512 data elements as shown in FIG. 24. As for configuration from Fourier transformation means 3 to the display unit, the Embodiment 6 is the same as the Embodiment 5.

Figure 25:
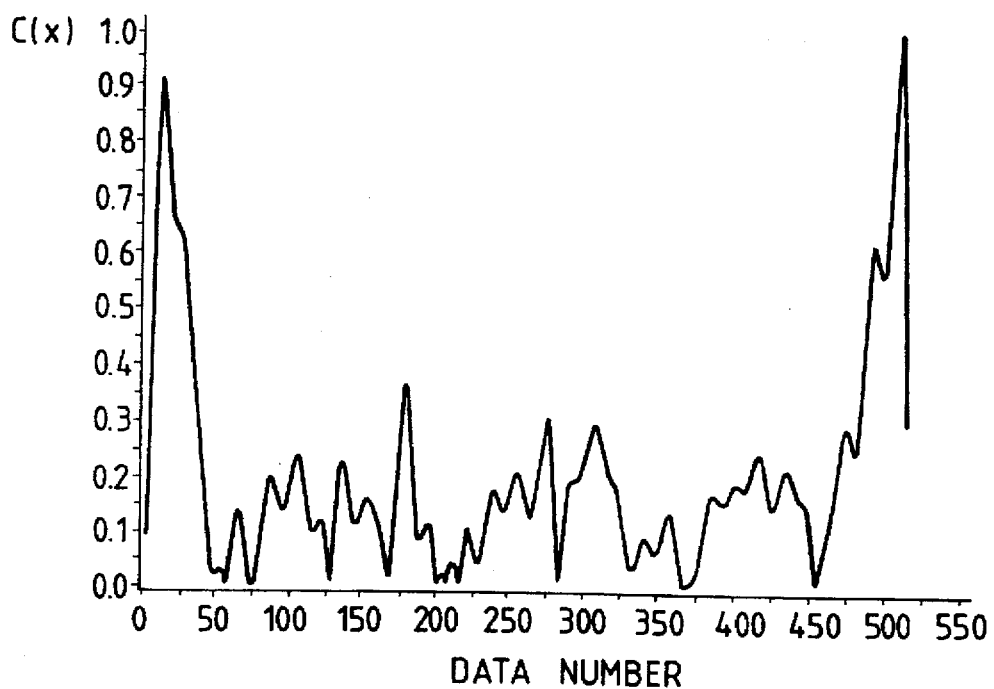
FIG. 25 is a curve illustrating data which has been subjected to the inverse Fourier transformation in the Embodiment 6 of the present invention.

This image data is subjected to the Fourier transformation, filtering and inverse Fourier transformation by the means 3, 4 and 5 which are the same as those used in the Embodiment 1, whereby the data shown in FIG. 25 is obtained. Further, the rough edge detecting means 6 detects, through the data processing described with reference to the Embodiment 5, the rough edge information shown in FIG. 26. The edge detecting means 7 calculates the data shown in FIG. 25 and the rough edge information shown in FIG. 26 as in the case of the Embodiment 5, thereby providing the result illustrated in FIG. 27.

This ultimate edge information is displayed by display means in a predetermined form as described above with reference to FIG. 1A.

Figure 26:
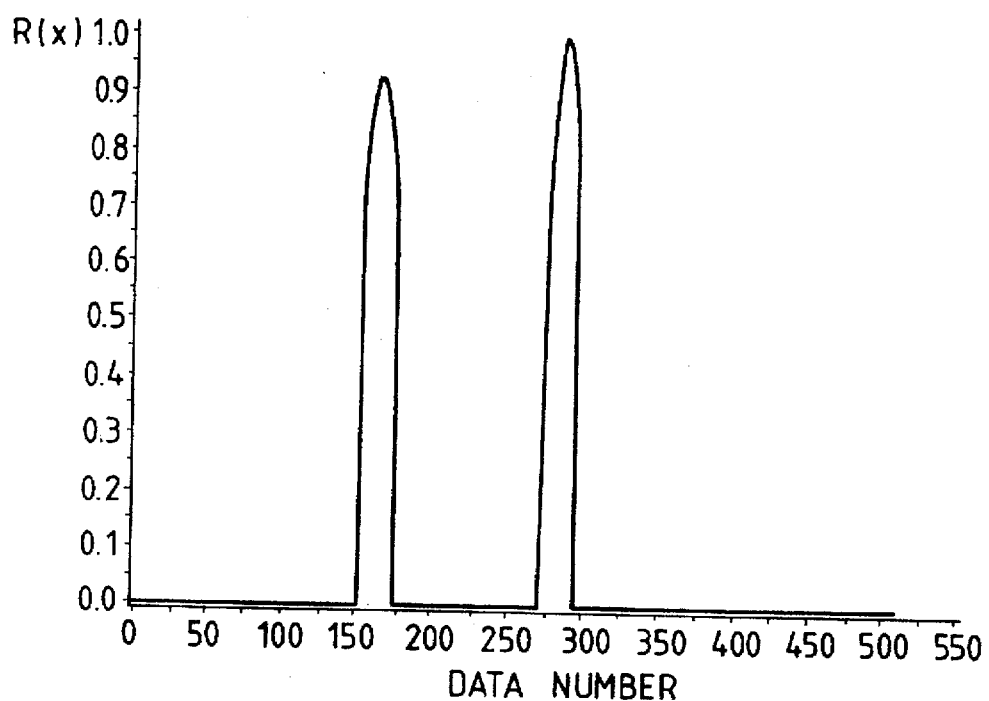
FIG. 26 is a graph illustrating data of rough edge information in the Embodiment 6 of the present invention.
Figure 27:
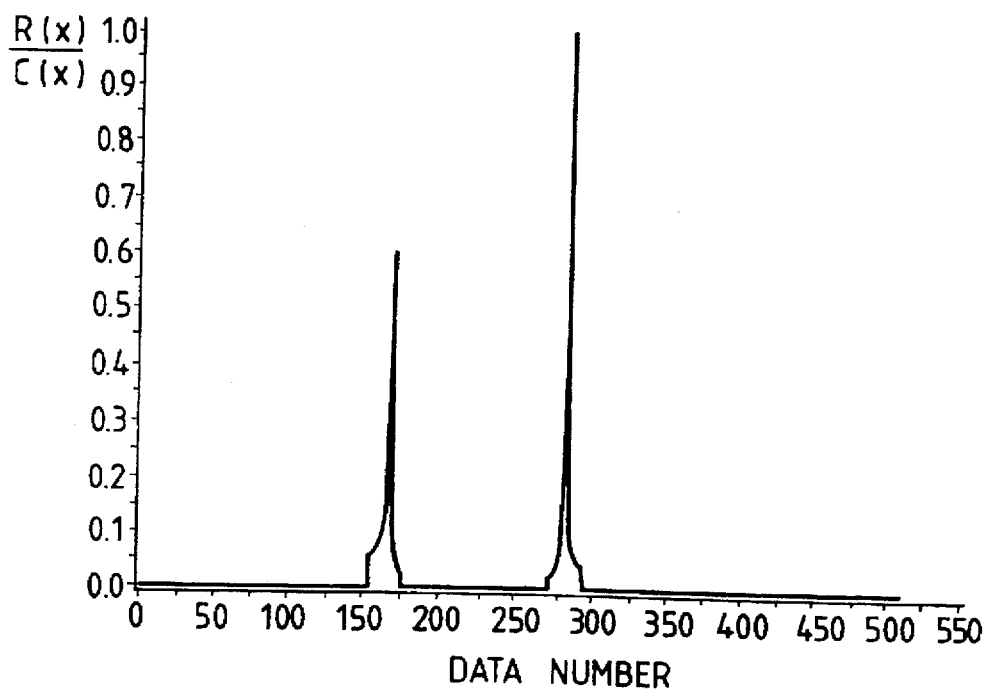
FIG. 27 is a diagram illustrating data of edge locations in the Embodiment 6 of the present invention.

In the Embodiment 6, peak values appear at a 167th data element and a 283rd data element respectively. Comparison between FIG. 24 and FIG. 27 will clarify that the Embodiment 6 is capable of accurately detecting edges at correct locations. The data shown in FIG. 25 through FIG. 27 are normalized to maximum values.

EMBODIMENT 7

Figure 28:
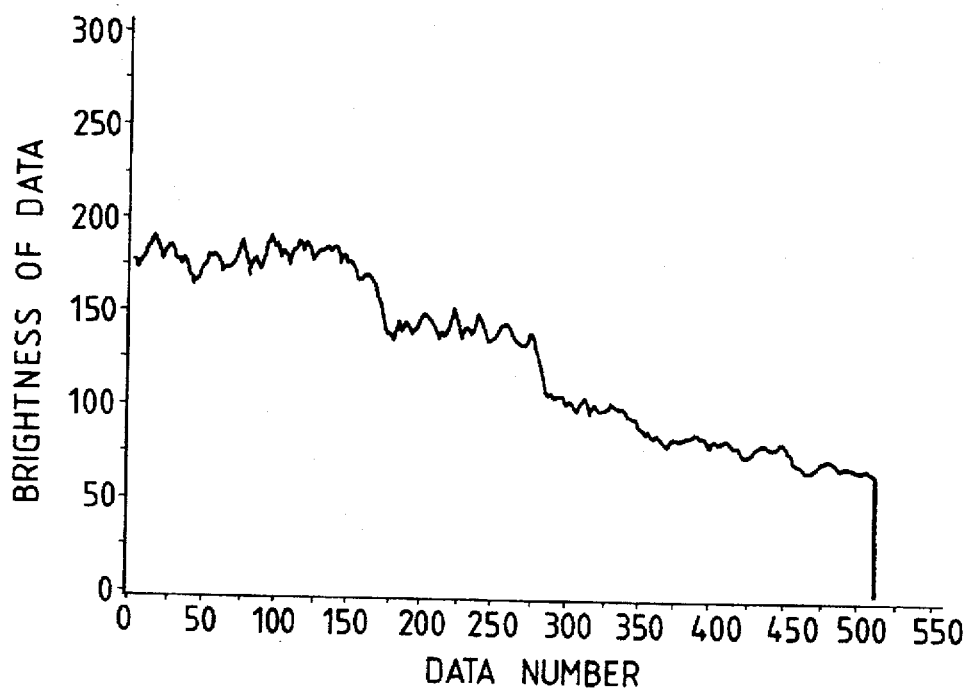
FIG. 28 is a curve illustrating data sampled in Embodiment 7 of the edge detecting device according to the present invention.
Figure 29:
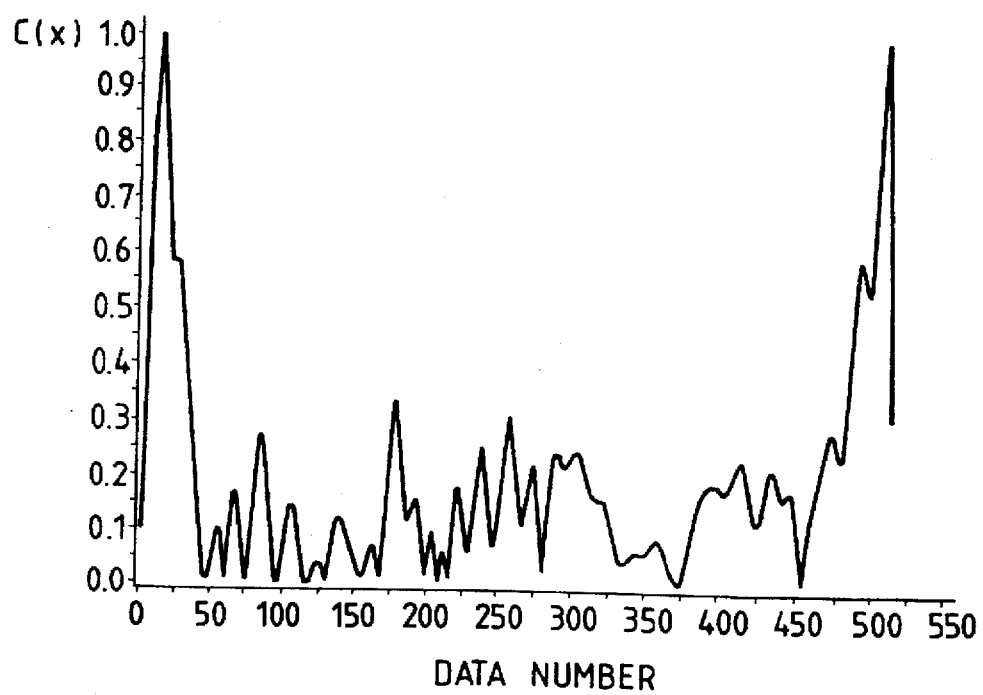
FIG. 29 is a curve illustrating data which has been subjected to the inverse Fourier transformation in the Embodiment 7 of the present invention.

The Embodiment 7 has the same configuration as that of the Embodiment 6, except for the rough edge detecting means 6. The Embodiment 7 uses, as an object, a glass plate which is similar to that adopted for the Embodiment 6 but utilizes a light beam reflected at a location which is different from that according to the Embodiment 6 on the object as an optical information to be received by a CCD camera. The data shown in FIG. 29 is obtained by subjecting the image data consisting of a train of 512 data elements shown in FIG. 28 to the Fourier transformation, filtering and inverse Fourier transformation by the means 3, 4 and 5 which are the same as those used in the embodiments described above.

Figure 30:
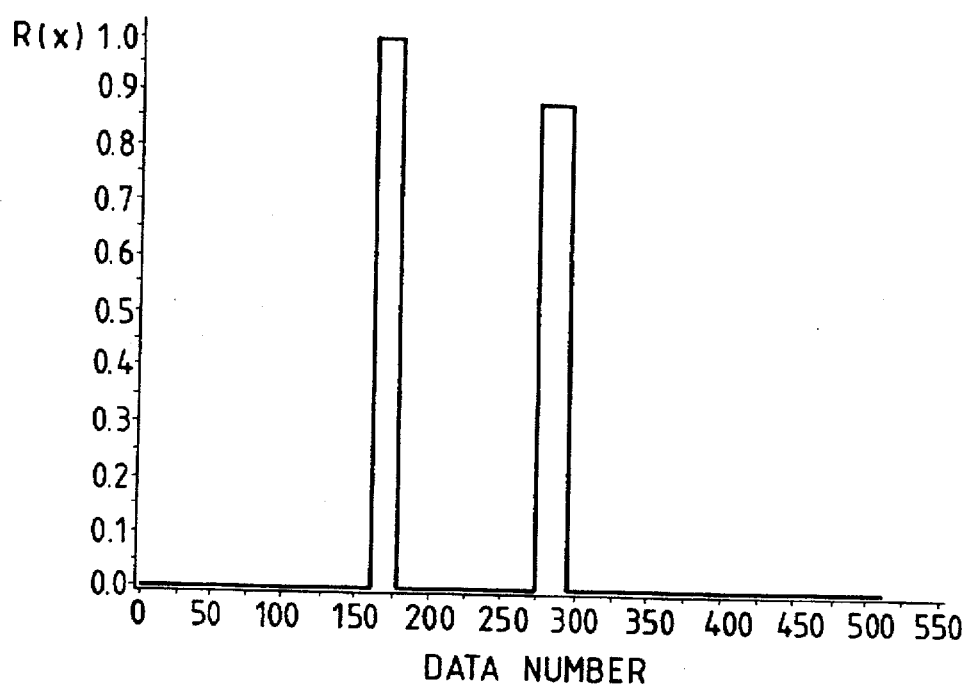
FIG. 30 is a graph illustrating data of the rough edge information in the Embodiment 7 of the present invention.

The rough edge detecting means 6 used in the Embodiment 7 will be described below. First, the image data shown in FIG. 28 is subjected to the Fourier transformation by the Fourier transformation means 3 described above, the data within the spatial frequency region thus obtained is filtered so as to cut off high-frequency components of rays of the fifteenth and higher orders, and the resultant data is subjected to the inverse Fourier transformation, thereby obtaining the data in the real space. Then, differences in value between a 1st data element and a 2nd data element, between the 2nd data element and a 3rd data element . . . are calculated sequentially over the entire range of the image data. The differences thus obtained are totalized within a section where sign of the differences remains unchanged. When the sign of the differences becomes different, the differences are totalized within the next section where the sign remains unchanged. This totalization is repeated over the entire range of the image data. In order to prevent edges from being detected on both the ends of the image data range, the total sums at 50 data elements located on each end of the image data range are zeroed and each of total sum values of the resultant train of data elements is squared. Assuming that edges are roughly located in the data sections which have the highest peak value and the second highest peak value out of the rectangular data sections thus obtained, values of the other rectangular data sections are zeroed and a train of the resulting data elements forming rectangular data sections is selected for use as rough edge information. FIG. 30 shows the rough edge information obtained by the processing described above.

Figure 31:
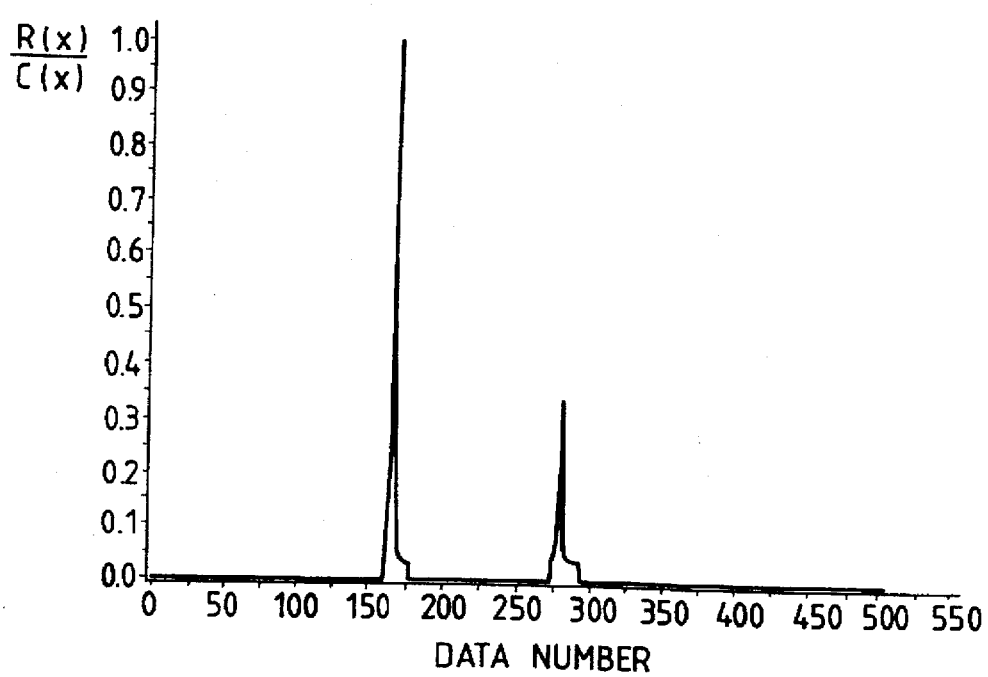
FIG. 31 is a graph illustrating data of edge locations in the Embodiment 7 of the present invention.

The edge detecting means 7 calculates the rough edge information and the data obtained by the inverse Fourier transformation means 5 for correlation, thereby providing the result shown in FIG. 31, which indicates peak values at a 167th data element and a 283rd data element, thus clarifying that the Embodiment 7 is capable of detecting locations of edges accurately. The ultimate edge information is displayed by displaying means in a predetermined form as described above with reference to FIG. 1A. The data shown in FIG. 29 through FIG. 31 are normalized to the maximum values thereof respectively.

In the Embodiments described above, the filtering means 4 cuts off only a component representing the zero order ray within spatial frequency regions in certain cases or not only the component representing the zero order ray but also component representing higher order rays in the other cases. However, it is fundamentally sufficient to cut off only the zero order ray, and it is preferable for practice to select a range of rays to be cut off dependently on level of noise contained in image data.

The Embodiments 1 through 4 adopt, as the rough edge detecting means 6 for roughly detecting locations of edges, the means for calculating the differences in value between data elements adjacent each other in the second data which is obtained by performing the filtering and inverse Fourier transformation of the first data prepared by the Fourier transformation or the means described with reference to the Embodiment 4, since the data which has already been prepared by the Fourier transformation means 3 is usable easily and conveniently. Therefore, the rough edge detecting means 6 is not limited to those used in the Embodiments 1 through 4, but may be a different adequate means. For example, the similar results can be obtained by detecting rough edge information from differences between neighboring data points on image data obtained by smoothing an original image.

Further, though the Embodiments 5 through 7 are adapted to use the rough edge detecting means 6 which detects rough locations of a plurality of edges at the same time, it is possible to detect an optional number of edges out of the plurality of edges, for example, a single edge out of two edges, by changing the number of peaks to be detected. Furthermore, the image data on which differences in lightness are to be calculated by the rough edge detecting means 6 need not be subjected to Fourier transformation, but may be image data obtained by smoothing an original image. In addition, the rough edge detecting means 6 may be any other means which does not calculate difference in lightness so far as it can detect rough locations of a plurality of edges at the same time and has the similar effect.

Though the Embodiments described above are adapted to detect edges in optical images, the edge detecting means to be used in the edge detecting device according to the present invention is not limited to detection of edges in optical images, but applicable to not only detection of all types of images formed by electromagnetic waves but also to processing of data in time series.

In addition, though the filtering means 4 used in each of the Embodiments is adapted to electrically cut off the zero order ray in the spatial frequency region, it may be replaced with another means such as a low pass filter which cuts off the zero order ray optically from real images.

What is claimed is:

1. An edge detecting device comprising:

an image pickup unit including an image pickup device which receives an optical information from an object and converts said optical information into an electrical image signal;

sampling means electrically connected with said image pickup unit for converting said image signal into digital image data including a train of data elements;

a first calculation block for obtaining preliminary edge data, electrically connected with said sampling means and comprising:

Fourier transformation means for converting said digital image data obtained by said sampling means into data in a spatial frequency region by performing a high-speed Fourier transformation;

filtering means for filtering said data in a spatial frequency region obtained from said Fourier transformation means to remove at least a zero order spatial frequency component therefrom; and inverse Fourier transformation means for converting the data in the spatial frequency region with said at least a zero order spatial frequency component thereof having been removed by said filtering means into data in real space to be output as the preliminary edge data, by performing a high-speed inverse Fourier transformation;

a second calculation block for detecting rough edge location, electrically connected with said sampling means and comprising:

a low pass filter, constructed and connected to remove high frequency components from said digital image data obtained by said sampling means to provide filtered data including a train of filtered data elements, first calculation means for calculating at least a difference in value between each pair of the filtered data elements located adjacent to each other in the train of said filtered data obtained by said low pass filter, in a range of at least one partial train of said filtered data obtained by said low pass filter, to provide difference data including a train of difference data elements;

second calculation means for zeroing each value of a plurality of the difference data elements contained in two partial trains located at respective ends of said difference data obtained by said first calculation means to produce processed difference data elements; and third calculation means for raising each value of the processed difference data elements from said second calculation means to a higher power to obtain rough edge data;

edge detecting means, electrically connected with each of said first calculation block and said second calculation block, for detecting an ultimate edge location information corresponding to edges contained in the optical information from the object, based on a correlation between the preliminary edge data obtained through said first calculation block and the rough edge data obtained through said second calculation block; and signal transmitting means for transmitting said ultimate edge location information obtained by said edge detecting means to external devices.

2. An edge detecting device according to claim 1, wherein said image pickup unit further includes an imaging lens disposed between said image pickup device and said object.

3. An edge detecting device according to claim 1, wherein said image pickup unit further includes:

a light source unit which radiates an incoherent light beam;

so that said image pickup device receives light reflected from or passing by the object being irradiated on with said incoherent light beam from said light source unit as the optical information from the object.

4. An edge detecting device according to claim 3, wherein said light source unit includes:

a lamp for emitting light for illumination, a concave reflecting mirror disposed in such a manner as to face said lamp, and a collimating lens disposed in a position where it faces said concave reflecting mirror across said lamp; and wherein said image pickup unit further includes a converging lens for converging said incoherent light beam from said light source unit and a hemispherical lens disposed in such a manner as to be allowed to contact with a surface to be measured of the object, for making the incoherent light beam having been converged by said converging lens be reflected at said surface to be measured of the object.

5. An edge detecting device according to claim 2, wherein said image pickup unit further includes:

a light source unit including:
a laser provided as a coherent light source, and
a beam expander for expanding a coherent light beam which is a laser beam emitted by said laser;

a converging lens for converging said coherent light beam from said light source unit;

a hemispherical lens disposed in such a manner to contact a surface of the object to be measured, for making the coherent light beam having been converged by said converging lens be reflected at said surface to be measured of the object and a diffuser disposed so as to face said imaging lens in a path of the coherent light beam having been reflected from said surface to be measured of the object; and wherein said image pickup device is disposed on an imaging surface of said imaging lens, for receiving an image formed thereon by said imaging lens as the optical information from the object.

6. An edge detecting device according to claim 2, wherein said image pickup unit further includes:

a light source unit for radiating a coherent light beam including:
a first laser provided as a coherent light source for emitting a first laser beam;
a second laser provided as another coherent light source for emitting a second laser beam which is different in wavelength from said first laser beam,
a beam splitter for combining said first and second laser beams to produce a composite laser beam, and
a beam expander for expanding said composite laser beam produced by said beam splitter;

a converging lens for converging the coherent light beam radiated by said light source unit;

a hemispherical lens disposed in such a manner as to be allowed to be contacted with a surface to be measured of the object, placed to reflect the coherent light beam, having been converged by said converging lens, at said surface of the object to be measured; and a diffuser which is disposed so as to face said imaging lens in a path of the coherent light beam having been reflected from said surface to be measured of the object and is rotatable around an optical axis; and wherein said image pickup device is disposed on an imaging surface of said imaging lens, for receiving an image formed thereon by said imaging lens as the optical information from the object.

7. An edge detecting device according to any one of claims 1, 2, 3, 4, 5 and 6, wherein said external devices include display means for displaying edge location of the object.

* * * * *